US011987201B2

(12) United States Patent
Nakamura et al.

(10) Patent No.: US 11,987,201 B2
(45) Date of Patent: May 21, 2024

(54) AIRBAG SYSTEM, OBJECT PROTECTION METHOD, AND PROGRAM

(71) Applicant: HONDA MOTOR CO., LTD., Tokyo (JP)

(72) Inventors: Hidetoshi Nakamura, Wako (JP); Kenji Komori, Wako (JP); Kenyu Okamura, Tokyo (JP); Osamu Ito, Wako (JP); Hiroyuki Asanuma, Wako (JP); Hyejin Bae, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/115,023

(22) Filed: Feb. 28, 2023

(65) Prior Publication Data

US 2023/0278520 A1  Sep. 7, 2023

(30) Foreign Application Priority Data

Mar. 3, 2022  (JP) ................................. 2022-032279

(51) Int. Cl.
*B60R 21/36* (2011.01)
(52) U.S. Cl.
CPC .................... *B60R 21/36* (2013.01)
(58) Field of Classification Search
CPC ................ B60R 21/34; B60R 21/36
See application file for complete search history.

(56) References Cited

U.S. PATENT DOCUMENTS

| 6,182,782 | B1 * | 2/2001 | Matsuura | ................ | B60R 21/36 180/274 |
| 2002/0014761 | A1 * | 2/2002 | Miyasaka | ............... | B60R 21/36 280/730.1 |
| 2003/0192731 | A1 * | 10/2003 | Kikuchi | .................. | B60R 21/36 180/274 |
| 2005/0098372 | A1 * | 5/2005 | Takimoto | ................ | B60R 21/36 180/274 |

(Continued)

FOREIGN PATENT DOCUMENTS

| CN | 1611392 A | * | 5/2005 | ............. | B60R 21/36 |
| CN | 204548014 U | * | 8/2015 | ......... | B60R 21/2338 |

(Continued)

*Primary Examiner* — Barry Gooden, Jr.
(74) *Attorney, Agent, or Firm* — Amin, Turocy & Watson, LLP

(57) ABSTRACT

An airbag system includes: a first left chamber that is expandable so as to cover an outer surface of a front left pillar which is located on a left side with respect to a vehicle width direction of a vehicle; a second left chamber that is expandable on the first left chamber; a first right chamber that is expandable so as to cover an outer surface of a front right pillar which is located on a right side with respect to the vehicle width direction of the vehicle; a second right chamber that is expandable on the first right chamber; a recognition portion that recognizes a risk object which is present in a vicinity of the vehicle; a prediction portion that predicts a collision between the risk object and the vehicle; and an expansion control portion that performs an expansion control of the first left chamber, the second left chamber, the first right chamber, and the second right chamber based on a prediction of the prediction portion.

13 Claims, 17 Drawing Sheets

(56) References Cited

U.S. PATENT DOCUMENTS

| | | | |
|---|---|---|---|
| 2006/0163852 A1* | 7/2006 | Okamoto | B60R 21/36 280/742 |
| 2009/0000847 A1* | 1/2009 | Takimoto | B60R 21/36 180/274 |
| 2009/0001691 A1* | 1/2009 | Takimoto | B60R 21/36 280/728.1 |
| 2010/0230944 A1* | 9/2010 | Narita | B60R 21/36 280/741 |
| 2015/0217719 A1* | 8/2015 | Vitet | B60R 21/36 180/274 |
| 2016/0059822 A1* | 3/2016 | Park | B60R 21/36 180/274 |
| 2016/0355152 A1* | 12/2016 | Perez Garcia | B60R 21/2338 |
| 2019/0077361 A1* | 3/2019 | Funahashi | B60R 21/38 |
| 2019/0084522 A1* | 3/2019 | Funahashi | B60R 21/0134 |
| 2019/0092272 A1* | 3/2019 | Funahashi | B62D 25/12 |
| 2021/0229623 A1* | 7/2021 | Kwon | B60R 21/213 |
| 2022/0097648 A1* | 3/2022 | Nagasawa | B60R 21/36 |
| 2022/0306030 A1* | 9/2022 | Nakamura | B60R 21/0134 |
| 2023/0073588 A1* | 3/2023 | Nagasawa | B60R 21/36 |
| 2023/0278521 A1* | 9/2023 | Nakamura | B60R 21/36 180/271 |
| 2023/0339425 A1* | 10/2023 | Harada | B60R 21/36 |

FOREIGN PATENT DOCUMENTS

| | | | | |
|---|---|---|---|---|
| CN | 105774742 B | * | 11/2018 | ............. B60R 21/36 |
| DE | 102013010394 B3 | * | 10/2014 | ........... B60R 21/233 |
| DE | 102014114355 A1 | * | 10/2015 | ............. B60R 21/36 |
| DE | 102020205479 A1 | * | 11/2020 | ........ B60R 21/0136 |
| EP | 1681212 A2 | * | 7/2006 | ............. B60R 21/36 |
| EP | 1992526 A2 | * | 11/2008 | ........... B60R 21/231 |
| EP | 3309017 A1 | * | 4/2018 | ............. B60R 21/34 |
| EP | 3653449 A1 | * | 5/2020 | ........... B60R 19/565 |
| JP | 07108903 A | * | 4/1995 | |
| JP | 07156749 A | * | 6/1995 | ............. B60R 21/36 |
| JP | 2007153062 A | * | 6/2007 | |
| JP | 2020-157839 | | 10/2020 | |
| JP | 2022150232 A | * | 10/2022 | ........ B60R 21/0134 |
| KR | 20130009326 A | * | 1/2013 | |
| KR | 20130012730 A | * | 2/2013 | |
| KR | 20160024258 A | * | 3/2016 | |
| WO | WO-2011089720 A1 | * | 7/2011 | ............. B60R 21/36 |
| WO | WO-2022050145 A1 | * | 3/2022 | ............. B60R 21/36 |

* cited by examiner

AIRBAG SYSTEM, OBJECT PROTECTION METHOD, AND PROGRAM

CROSS-REFERENCE TO RELATED APPLICATION

Priority is claimed on Japanese Patent Application No. 2022-032279, filed on Mar. 3, 2022, the contents of which are incorporated herein by reference.

BACKGROUND

Field of the Invention

The present invention relates to an airbag system, an object protection method, and a program.

Background

For example, Japanese Unexamined Patent Application, First Publication No. 2020-157839 discloses an airbag apparatus that covers a front pillar upper surface and a front pillar outer surface of a vehicle from the outside. According to the airbag apparatus disclosed in Japanese Unexamined Patent Application, First Publication No. 2020-157839, it is possible to relieve an impact when a protection target such as a pedestrian or a cyclist collides with a vehicle.

SUMMARY

Even the airbag apparatus disclosed in Japanese Unexamined Patent Application, First Publication No. 2020-157839 can greatly relieve the impact to the protection target. However, it is desirable to further reduce the impact on the protection target at the time of collision.

For example, a pedestrian and a cyclist generally differ in travel speed. Further, for example, the travel speed of a rider is much faster than that of the pedestrian. When the speed of the protection target at the time of collision is different, a collision energy also changes. Therefore, in order to further reduce the impact on a protection target of which the travel speed is fast, it is preferable that the potential energy in the airbag apparatus be changed in accordance with the type or the speed of the protection target.

An object of an aspect of the present invention is to provide an airbag system, an object protection method, and a program capable of changing potential energy.

An airbag system according to a first aspect of the present invention includes: a first left chamber that is expandable so as to cover an outer surface of a front left pillar which is located on a left side with respect to a vehicle width direction of a vehicle; a second left chamber that is expandable on the first left chamber; a first right chamber that is expandable so as to cover an outer surface of a front right pillar which is located on a right side with respect to the vehicle width direction of the vehicle; a second right chamber that is expandable on the first right chamber; a recognition portion that recognizes a risk object which is present in a vicinity of the vehicle; a prediction portion that predicts a collision between the risk object and the vehicle; and an expansion control portion that performs an expansion control of the first left chamber, the second left chamber, the first right chamber, and the second right chamber based on a prediction of the prediction portion.

A second aspect is the airbag system according to the first aspect described above, wherein in a case where the prediction portion predicts a collision position of the risk object in the vehicle, the expansion control portion may expand only the first left chamber, or the first left chamber and the second left chamber when the collision position is a left side with respect to the vehicle width direction of the vehicle, and may expand only the first right chamber, or the first right chamber and the second right chamber when the collision position is a right side with respect to the vehicle width direction of the vehicle.

A third aspect is the airbag system according to the second aspect described above, wherein in a case where the recognition portion recognizes a pedestrian as the risk object and the prediction portion predicts a collision between the pedestrian and the vehicle, the expansion control portion may expand the first left chamber or the first right chamber in accordance with the collision position when a speed of the vehicle is in a first speed range, and may expand both the first left chamber and the second left chamber, or both the first right chamber and the second right chamber in accordance with the collision position when the speed of the vehicle is in a second speed range on a higher speed side than the first speed range.

A fourth aspect is the airbag system according to the second or third aspect described above, wherein in a case where the recognition portion recognizes a pedestrian as the risk object, when it is predicted that the pedestrian will collide with the vehicle, the prediction portion may predict a time at which a head portion of the pedestrian collides with the vehicle based on body information of the pedestrian and a speed of the vehicle, and the expansion control portion may perform the expansion control in accordance with the time.

A fifth aspect is the airbag system according to the fourth aspect described above, wherein the prediction portion may predict that a time at which the head portion collides with the vehicle is later as a head portion position of the pedestrian is higher and may predict that the time at which the head portion collides with the vehicle is earlier as a speed of the vehicle is faster.

A sixth aspect is the airbag system according to any one of the second to fifth aspects described above, wherein in a case where the recognition portion recognizes a pedestrian as the risk object and the collision position of the risk object in the vehicle that is predicted by the prediction portion is in a preset middle range in the vehicle width direction, the expansion control portion may expand at least the first left chamber and the first right chamber.

A seventh aspect is the airbag system according to the second aspect described above, wherein in a case where the recognition portion recognizes another vehicle on which a person rides in a state where a body is exposed to an outside as the risk object and the prediction portion predicts a collision between the other vehicle and the vehicle, the expansion control portion may expand the first left chamber and the second left chamber, or the first right chamber and the second right chamber in accordance with the collision position.

An eighth aspect is the airbag system according to the second or seventh aspect described above, wherein in a case where the recognition portion recognizes another vehicle on which a person rides in a state where a body is exposed to an outside as the risk object, when it is predicted that the other vehicle will collide with the vehicle, the prediction portion may predict a time at which a head portion of a person who rides on the other vehicle collides with the vehicle based on a head portion position of the person who rides on the other vehicle and a relative speed of the other vehicle relative to the vehicle, and the expansion control portion may perform the expansion control in accordance with the time.

A ninth aspect is the airbag system according to the eighth aspect described above, wherein the prediction portion may predict that a time at which the head portion collides with the vehicle is later as the head portion position is higher and may predict that the time at which the head portion collides with the vehicle is earlier as the relative speed is faster.

A tenth aspect is the airbag system according to any one of the first to ninth aspects described above, wherein when the first left chamber is expanded, the expansion control portion may reduce an internal pressure of the first left chamber in accordance with a timing when the risk object comes into contact with the first left chamber, and when the first right chamber is expanded, the expansion control portion may reduce an internal pressure of the first right chamber in accordance with a timing when the risk object comes into contact with the first right chamber.

An eleventh aspect is the airbag system according to any one of the first to tenth aspects described above, wherein when the prediction portion predicts that there are a plurality of risk objects that will collide with the vehicle, or when the prediction portion is not able to predict a collision position of the risk object in the vehicle, the expansion control portion may expand at least the first left chamber and the first right chamber.

An object protection method according to a twelfth aspect of the present invention includes: recognizing a periphery situation of a vehicle; predicting a collision between a recognized risk object and the vehicle; and based on a prediction, performing an expansion control of a first left chamber that is expandable so as to cover an outer surface of a front left pillar which is located on a left side with respect to a vehicle width direction of the vehicle, a second left chamber that is expandable on the first left chamber, a first right chamber that is expandable so as to cover an outer surface of a front right pillar which is located on a right side with respect to the vehicle width direction of the vehicle, and a second right chamber that is expandable on the first right chamber.

A thirteenth aspect of the present invention is a computer-readable non-transitory recording medium which includes a program causing a computer to: recognize a risk object which is present in a vicinity of a vehicle; predict a collision between the risk object and the vehicle; and based on a prediction, perform an expansion control of a first left chamber that is expandable so as to cover an outer surface of a front left pillar which is located on a left side with respect to a vehicle width direction of the vehicle, a second left chamber that is expandable on the first left chamber, a first right chamber that is expandable so as to cover an outer surface of a front right pillar which is located on a right side with respect to the vehicle width direction of the vehicle, and a second right chamber that is expandable on the first right chamber.

According to the first to thirteenth aspects described above, by selectively expanding the first left chamber, the second left chamber, the first right chamber, and the second right chamber, it is possible to change a potential energy.

DESCRIPTION OF EMBODIMENTS

Hereinafter, an airbag apparatus and an airbag system according to an embodiment of the present invention will be described with reference to the drawings. Hereinafter, the airbag apparatus and the airbag system are provided on a vehicle that includes a front pillar. The vehicle includes a vehicle having three wheels, four wheels, or the like, a motorcycle, a micro-mobility, and the like and may include any vehicle on which a person rides. In the embodiments described below, the vehicle is a four-wheel vehicle, and a vehicle on which the airbag apparatus and the airbag system are provided is referred to as a vehicle M.

[Vehicle System]

Figure 1:
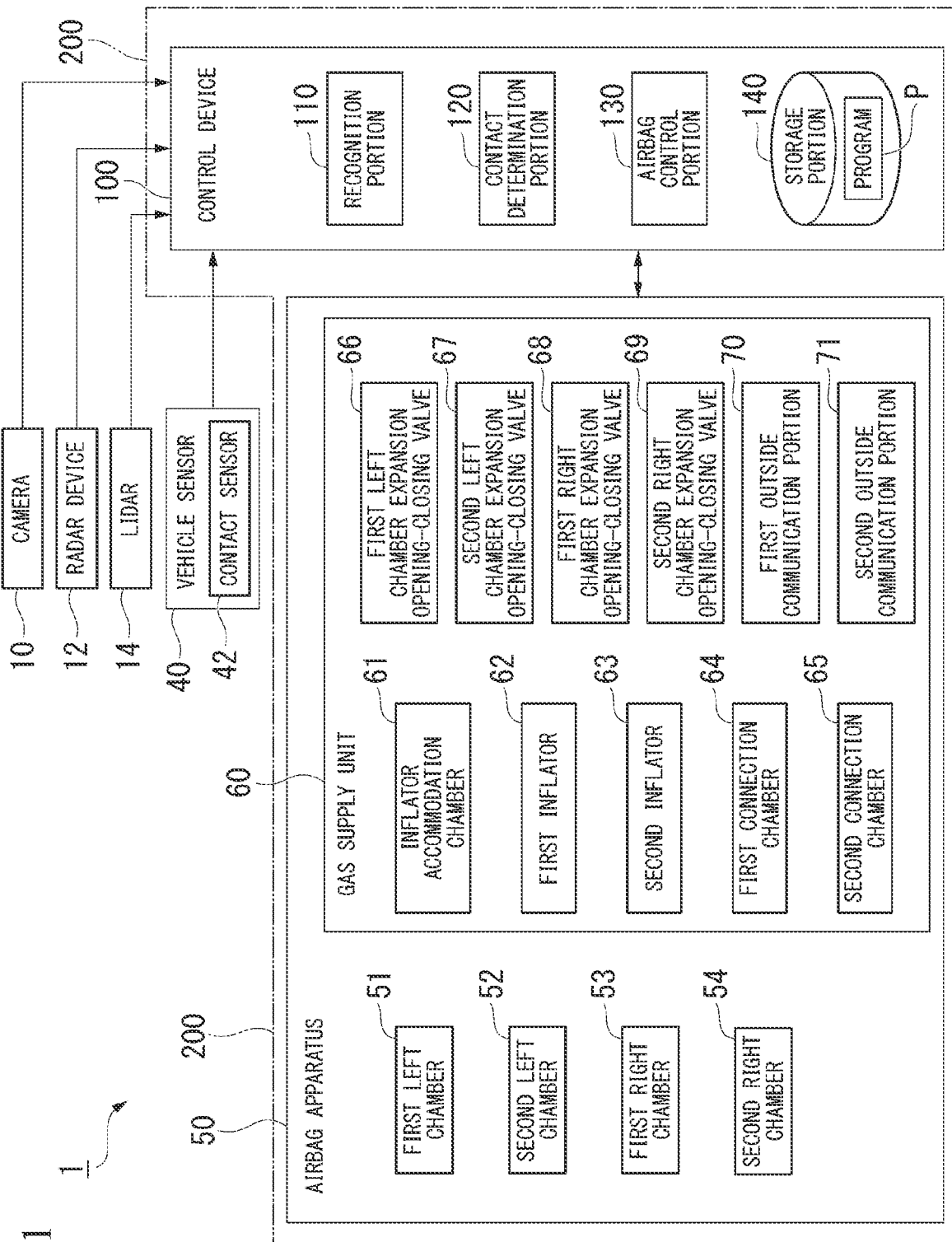
FIG. 1 is a functional block diagram showing an example of a vehicle system that includes an airbag apparatus and an airbag system according to an embodiment.

FIG. 1 is a functional block diagram showing an example of a vehicle system 1 that is provided on a vehicle M. As shown in FIG. 1, the vehicle system 1 includes an airbag apparatus 50 and an airbag system 200 according to an embodiment. The vehicle M on which the vehicle system 1 is provided may be any of a vehicle that uses an internal combustion engine such as a diesel engine or a gasoline engine as a power source, an electric vehicle that uses an electric motor as the power source, and a hybrid vehicle that includes both the internal combustion engine and the electric motor. In the following description, a forward-rearward direction, a rightward-leftward direction, and an upward-downward direction correspond to a vehicle forward-rearward direction, a vehicle rightward-leftward direction, and a vehicle upward-downward direction, and the rightward-leftward direction may be referred to as a vehicle width direction or a lateral direction.

As shown in FIG. 1, the vehicle system 1 includes, for example, a camera 10, a radar device 12, a LIDAR (Light Detection and Ranging) 14, a vehicle sensor 40, the airbag apparatus 50, and a control device 100.

The camera 10 is, for example, a digital camera that uses a solid-state imaging device such as a CCD (Charge Coupled Device) or a CMOS (Complementary Metal Oxide Semiconductor. The camera 10 is attached to an arbitrary place of a vehicle (hereinafter, a vehicle M) on which the vehicle system 1 is provided. When a forward direction of the vehicle M is imaged, the camera 10 is attached to an upper portion of a front windshield, a rear surface of a rearview mirror, a front head portion of a vehicle body, or the like. When a rearward direction is imaged, the camera 10 may be attached to an upper portion of a rear windshield, a backdoor, or the like, or may be attached to a door mirror, or the like. For example, the camera 10 periodically repeats imaging the vicinity of the vehicle M. The camera 10 may be a stereo camera.

The radar device 12 radiates radio waves such as millimeter waves to the vicinity of the vehicle M, detects radio waves (reflected waves) reflected by an object in the vicinity and detects at least a position (a distance and an orientation) of the object. The radar device 12 is attached to an arbitrary place of the vehicle M. The radar device 12 may detect the position and a speed of the object using a FM-CW (Frequency Modulated Continuous Wave) method.

The LIDAR 14 radiates light to the vicinity of the vehicle M and measures scattered light. The LIDAR 14 detects the distance to a target on the basis of time from light emission to light reception. The radiated light is, for example, pulsed laser light. The LIDAR 14 is attached to an arbitrary place of the vehicle M.

The vehicle sensor 40 includes, for example, a contact sensor 42. The contact sensor 42 is a sensor that detects a contact between the vehicle M and an object. The contact sensor 42 is provided, for example, on at least a front portion of the vehicle body. Further, the contact sensor 42 may be provided at an arbitrary rear or side position. The contact sensor 42 detects a load on the vehicle body and outputs a detection value of the detected load. The contact sensor 42 may use, for example, a pressure sensor.

Further, the vehicle sensor 40 may include, in addition to the contact sensor 42, a vehicle speed sensor that detects the speed of the vehicle M, an acceleration sensor that detects the acceleration, a yaw rate sensor that detects a yaw rate (for example, a rotation angular speed around a vertical axis that passes through the center of gravity of the vehicle M), an orientation sensor that detects the orientation of the vehicle M, and the like. The vehicle sensor 40 may include a position sensor that detects the position of the vehicle M. The position sensor is, for example, a sensor that acquires position information (longitude and latitude information) from a GPS (Global Positioning System) device. The position sensor may be, for example, a sensor that acquires position information using a GNSS (Global Navigation Satellite System) receiver.

[Airbag Apparatus]

The airbag apparatus 50 is a vehicle external airbag apparatus that reduces a load on an object (for example, a pedestrian, a cyclists, and a rider) that comes into contact with the vehicle M. As shown in FIG. 1, the airbag apparatus 50 includes a first left chamber 51, a second left chamber 52, a first right chamber 53, and a second right chamber 54.

Figure 2:
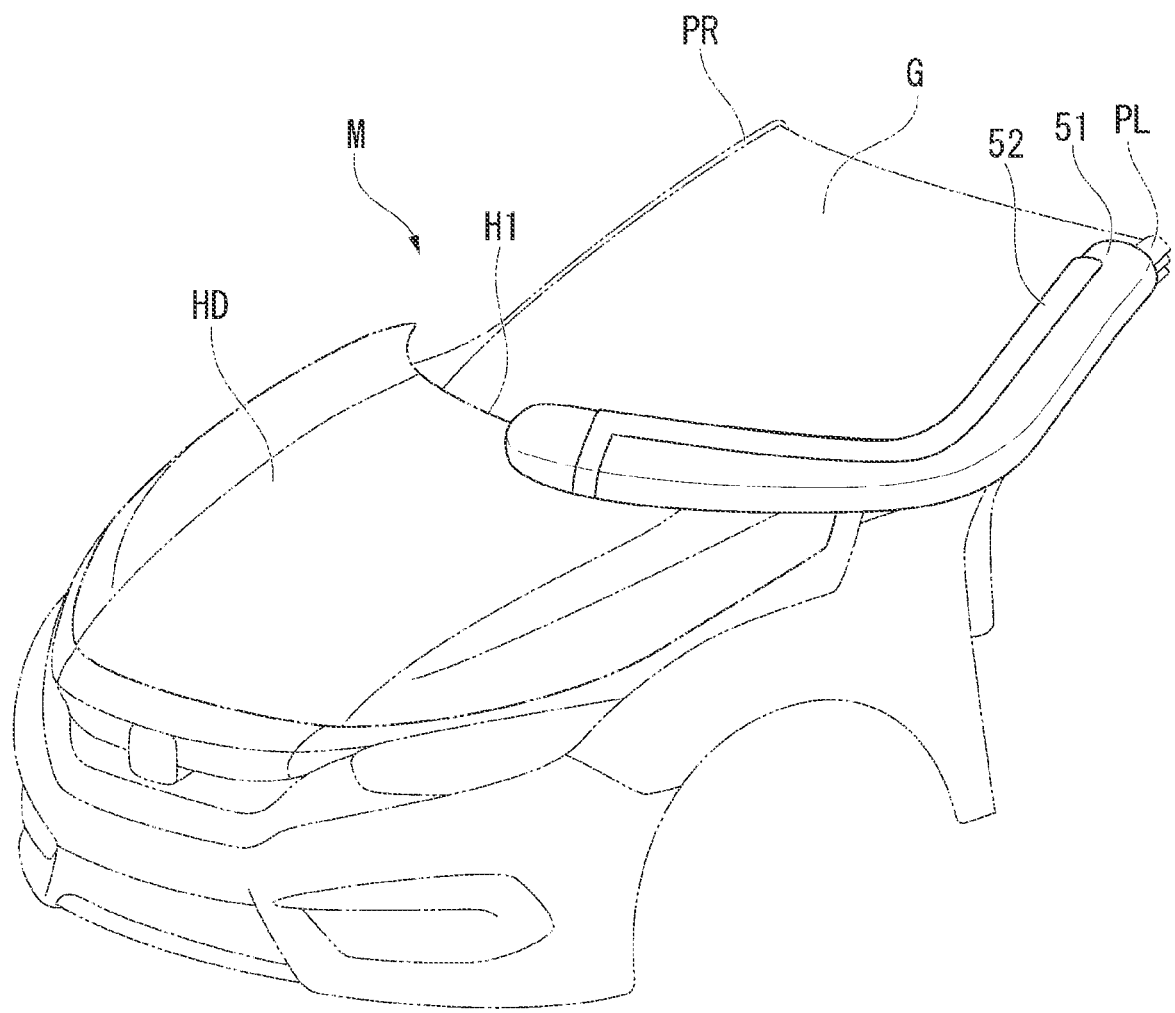
FIG. 2 is a partial perspective view of a vehicle showing a condition in which only a first left chamber is expanded.
Figure 3:
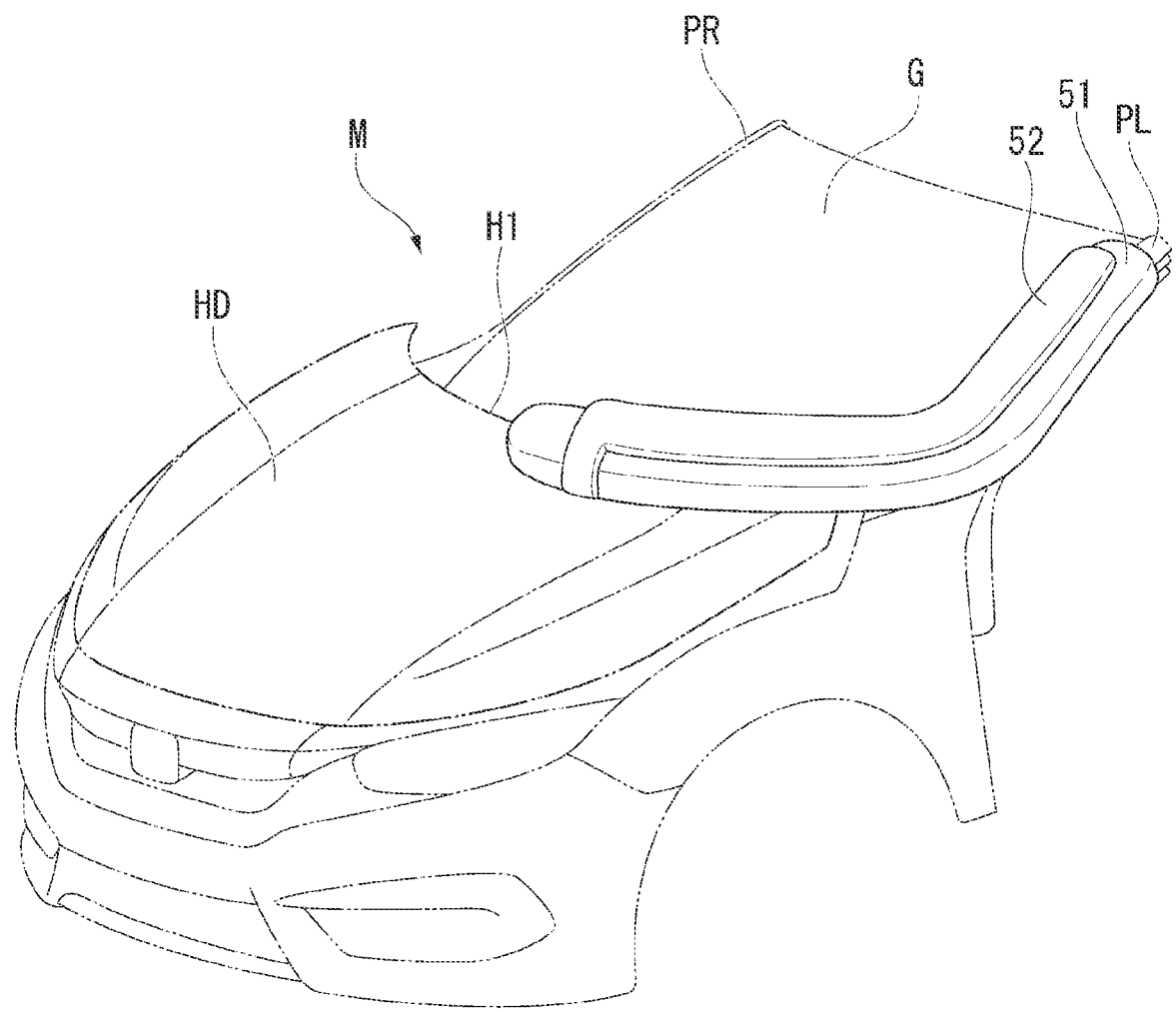
FIG. 3 is a partial perspective view of the vehicle showing a condition in which the first left chamber and a second left chamber are expanded.
Figure 4:
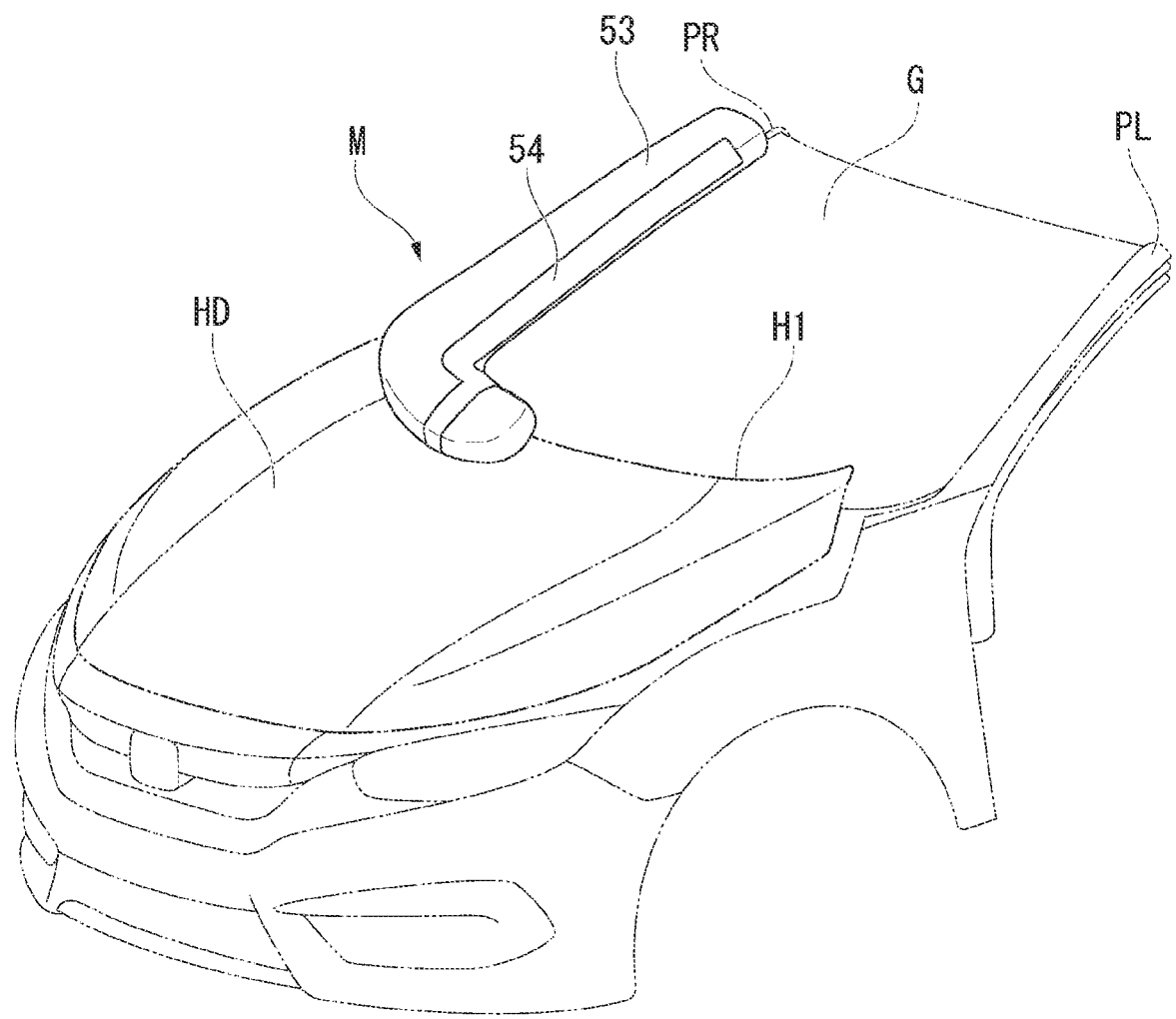
FIG. 4 is a partial perspective view of the vehicle showing a condition in which only a first right chamber is expanded.
Figure 5:
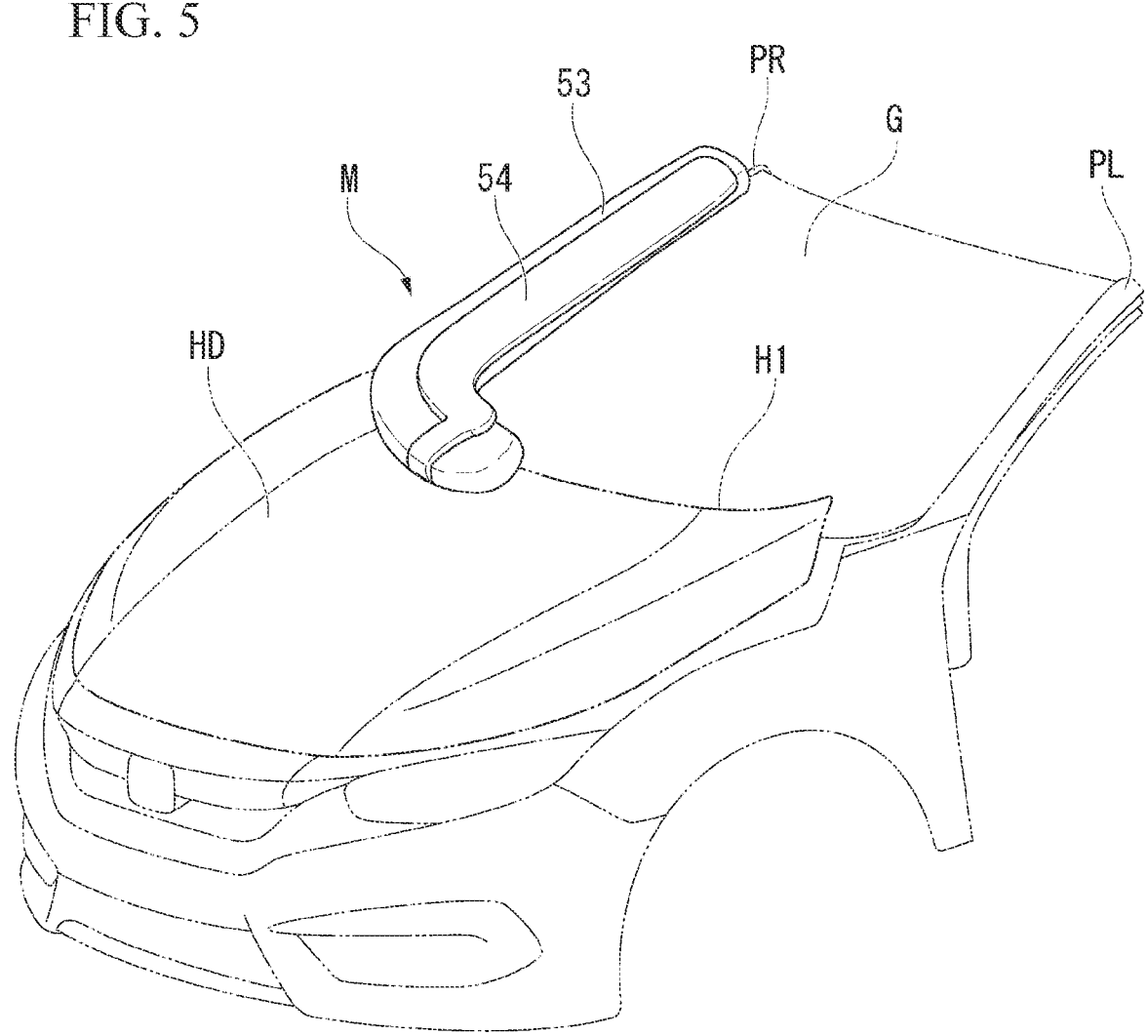
FIG. 5 is a perspective view of the vehicle showing a condition in which the first right chamber and a second right chamber are expanded.
Figure 6:
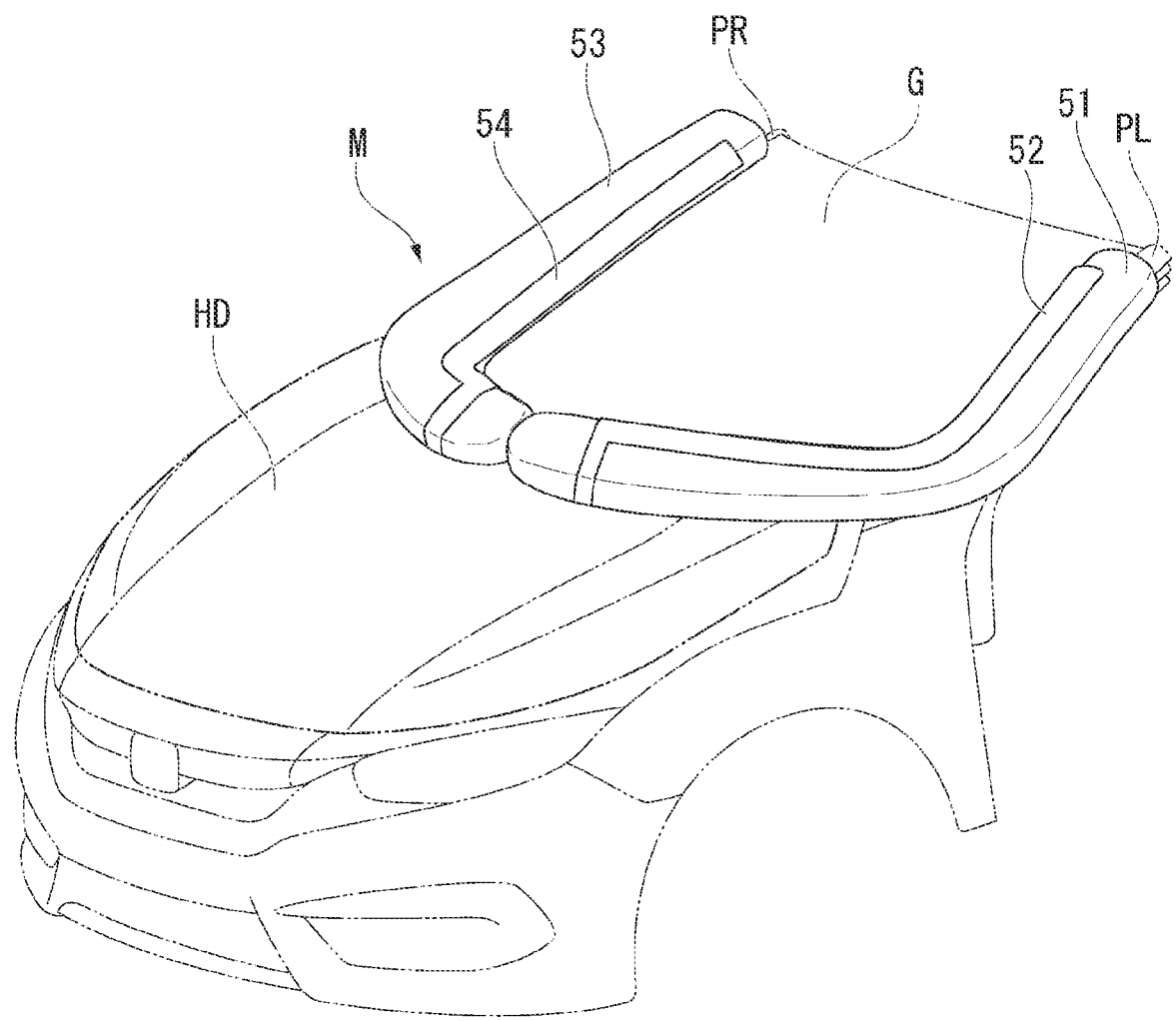
FIG. 6 is a perspective view of the vehicle showing a condition in which the first left chamber and the first right chamber are expanded.

FIG. 2 is a partial perspective view of the vehicle M showing a condition in which only the first left chamber 51 is expanded. FIG. 3 is a partial perspective view of the vehicle M showing a condition in which the first left chamber 51 and the second left chamber 52 are expanded. FIG. 4 is a partial perspective view of the vehicle M showing a condition in which only the first right chamber 53 is expanded. FIG. 5 is a perspective view of the vehicle M showing a condition in which the first right chamber 53 and the second right chamber 54 are expanded. FIG. 6 is a perspective view of the vehicle M showing a condition in which the first left chamber 51 and the first right chamber 53 are expanded. As shown in FIG. 2 to FIG. 6, the airbag apparatus 50 can selectively expand the first left chamber 51, the second left chamber 52, the first right chamber 53, and the second right chamber 54.

As shown in FIG. 2 to FIG. 6, the vehicle M includes a front left pillar PL that is located at a leftward position of a front windshield G and a front right pillar PR that is located at a rightward position of the front windshield G. The vehicle M includes a hood HD that is located at a forward position of the front windshield G. The front left pillar PL and the front right pillar PR extend to be inclined relative to a vertical direction to be directed upward from a front end toward a rear end.

The first left chamber 51, the second left chamber 52, the first right chamber 53, and the second right chamber 54 are expanded so as to cover the front left pillar PL or the front right pillar PR from the outside when a gas is supplied. Further, the first left chamber 51, the second left chamber 52, the first right chamber 53, and the second right chamber 54 are expanded so as to cover an outer surface of a rear end portion H1 of the hood HD when the gas is supplied. However, the first left chamber 51, the second left chamber 52, the first right chamber 53, and the second right chamber 54 may not cover the outer surface of the rear end portion H1 of the hood HD at the time of expansion.

Figure 7:
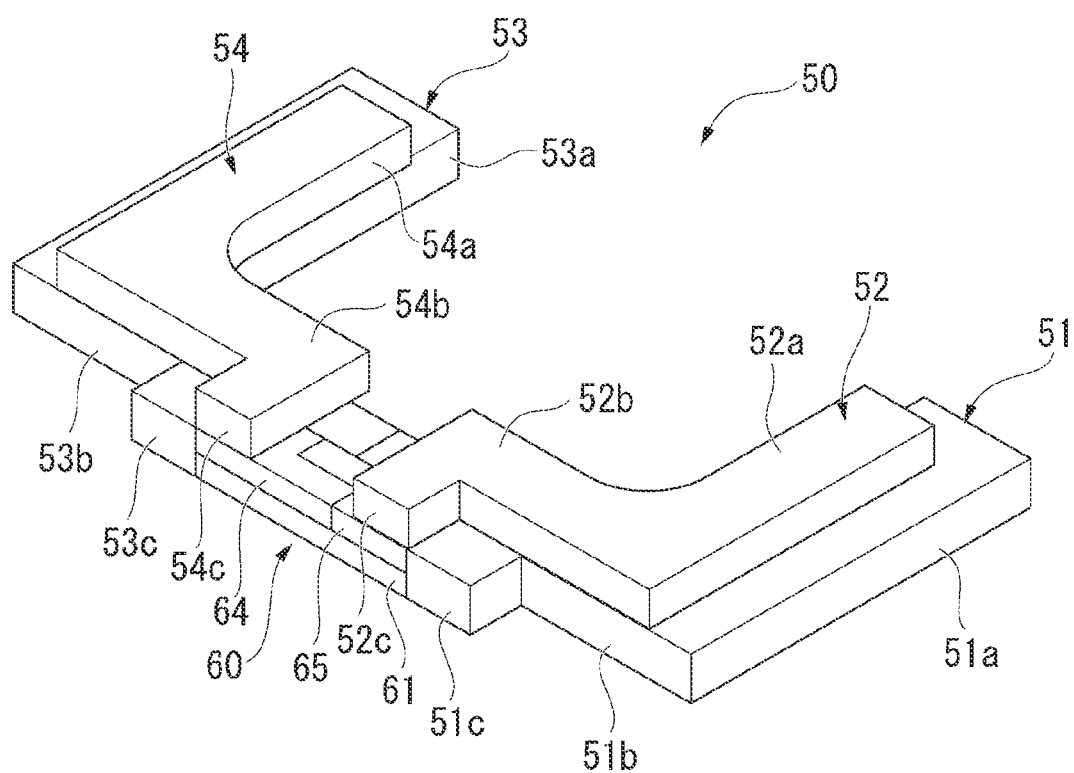
FIG. 7 is a schematic perspective view of an airbag apparatus according to the embodiment.
Figure 8:
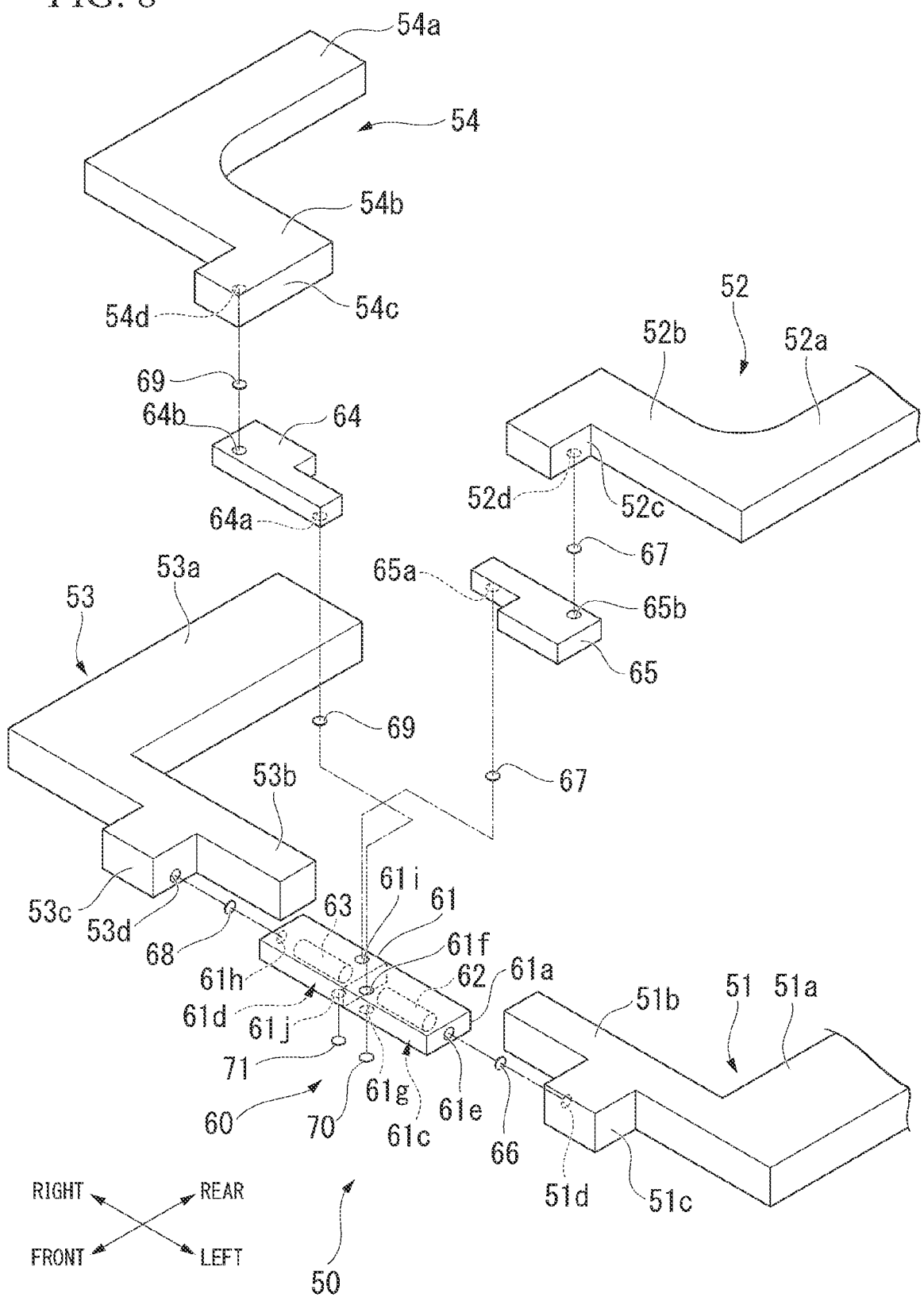
FIG. 8 is a schematic exploded perspective view of the airbag apparatus according to the embodiment.

A detailed structure of the airbag apparatus 50 is described with reference to FIG. 7 to FIG. 9. FIG. 7 is a schematic perspective view of the airbag apparatus 50. FIG. 8 is an exploded perspective view of the airbag apparatus 50. As shown in FIG. 7 and FIG. 8, the airbag apparatus 50 includes the first left chamber 51, the second left chamber 52, the first right chamber 53, the second right chamber 54, and a gas supply unit 60. FIG. 7 and FIG. 8 show a state in which all of the first left chamber 51, the second left chamber 52, the first right chamber 53, and the second right chamber 54 are expanded for ease of explanation. The first left chamber 51, the second left chamber 52, the first right chamber 53, and the second right chamber 54 are a bag body that is inflated and expanded by a gas for expansion being supplied. The first left chamber 51, the second left chamber 52, the first right chamber 53, and the second right chamber 54 are deflated before the airbag apparatus 50 is operated and is accommodated, for example, below the hood HD of the vehicle M.

The first left chamber 51 is expandable so as to cover the outer surface of the front left pillar PL that is located on a left side with respect to the vehicle width direction of the vehicle M. The first left chamber 51 includes a left pillar coverage portion 51a and a hood coverage portion 51b. The left pillar coverage portion 51a extends in a forward-rearward direction of the vehicle M along the extension direction of the front left pillar PL in the first left chamber 51 at the time of expansion. The left pillar coverage portion 51a covers the outer surface of the front left pillar PL when the first left chamber 51 is expanded.

The hood coverage portion 51b extends rightward from a front end section of the left pillar coverage portion 51a in the first left chamber 51 at the time of expansion. The hood coverage portion 51b covers the outer surface of a left section of the rear end portion H1 of the hood HD when the first left chamber 51 is expanded. Further, the hood coverage portion 51b includes a connection portion 51c that is connected to the gas supply unit 60. As shown in FIG. 8, a gas introduction opening 51d for introducing the gas into the first left chamber 51 is provided on a right side surface of the connection portion 51c.

The second left chamber 52 is located on the first left chamber 51 and is expandable on the first left chamber 51. The second left chamber 52 includes a left pillar coverage portion 52a and a hood coverage portion 52b. The left pillar coverage portion 52a extends in a forward-rearward direction of the vehicle M along the extension direction of the front left pillar PL in the second left chamber 52 at the time of expansion. The left pillar coverage portion 52a is located on the left pillar coverage portion 51a of the first left chamber 51 when the second left chamber 52 is expanded.

The hood coverage portion 52b extends rightward from a front end section of the left pillar coverage portion 52a in the second left chamber 52 at the time of expansion. The hood coverage portion 52b covers a left section of the rear end portion H1 of the hood HD from the outside when the second left chamber 52 is expanded. Further, the hood coverage portion 52b includes a connection portion 52c that is connected to the gas supply unit 60. As shown in FIG. 8, a gas introduction opening 52d for introducing the gas into the second left chamber 52 is provided on a lower surface of the connection portion 52c.

Figure 9:
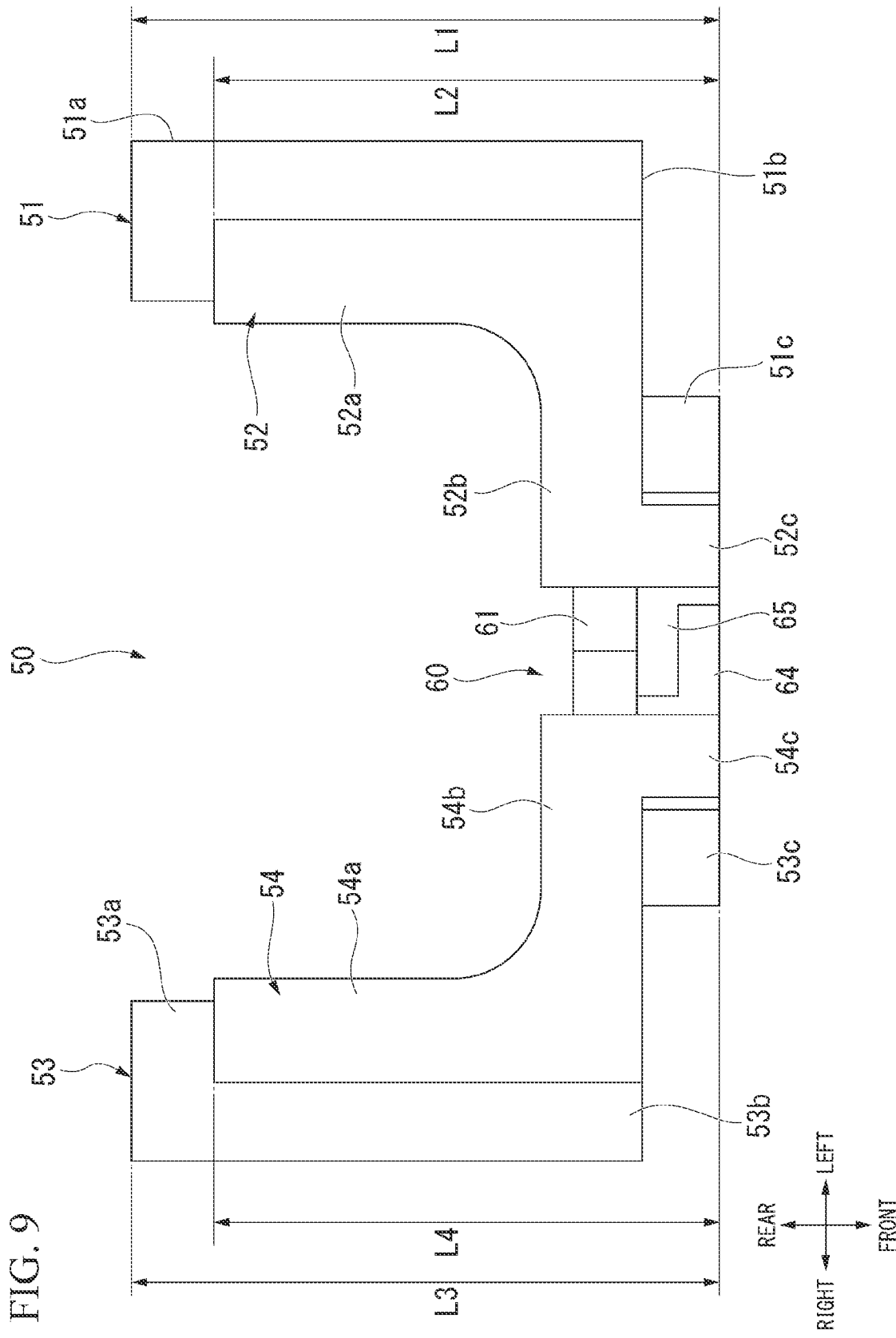
FIG. 9 is a schematic view of the airbag apparatus when seen from a normal direction of a front windshield.

FIG. 9 is a schematic view of the airbag apparatus 50 when seen from a normal direction of the front windshield G. As shown in FIG. 9, with respect to the forward-rearward direction, the position of a front end of the first left chamber 51 is matched with the position of a front end of the second left chamber 52. On the other hand, with respect to the forward-rearward direction, the position of a rear end of the first left chamber 51 is located at a further rearward position than the position of a rear end of the second left chamber 52. As a result, with respect to the forward-rearward direction (a direction along the extension direction of the front left pillar PL), a length L2 of the second left chamber 52 at the time of expansion is smaller than a length L1 of the first left chamber 51 at the time of expansion.

Further, as shown in FIG. 9, the left pillar coverage portion 52a of the second left chamber 52 at the time of expansion is located on the right side with respect to the vehicle width direction relative to the left pillar coverage portion 51a of the first left chamber 51 at the time of expansion. Further, a rear edge of the hood coverage portion 52b of the second left chamber 52 at the time of expansion is located at a further rearward position than a rear edge of the hood coverage portion 51b of the first left chamber 51 at the time of expansion. That is, the second left chamber 52 at the time of expansion is located at a further middle side of the vehicle M than the first left chamber 51 at the time of expansion.

The first right chamber 53 is expandable so as to cover the outer surface of the front right pillar PR that is located on a right side with respect to the vehicle width direction of the vehicle M. The first right chamber 53 includes a right pillar coverage portion 53a and a hood coverage portion 53b. The right pillar coverage portion 53a extends in the forward-rearward direction of the vehicle M along the extension direction of the front right pillar PR in the first right chamber 53 at the time of expansion. The right pillar coverage portion 53a covers the outer surface of the front right pillar PR when the first right chamber 53 is expanded.

The hood coverage portion 53b extends leftward from a front end section of the right pillar coverage portion 53a in the first right chamber 53 at the time of expansion. The hood coverage portion 53b covers the outer surface of a right section of the rear end portion H1 of the hood HD when the first right chamber 53 is expanded. Further, the hood coverage portion 53b includes a connection portion 53c that is connected to the gas supply unit 60. As shown in FIG. 8, a gas introduction opening 53d for introducing the gas into the first right chamber 53 is provided on a left side surface of the connection portion 53c.

The second right chamber 54 is located on the first right chamber 53 and is expandable on the first right chamber 53. The second right chamber 54 includes a right pillar coverage portion 54a and a hood coverage portion 54b. The right pillar coverage portion 54a extends in the forward-rearward direction of the vehicle M along the extension direction of the front right pillar PR in the second right chamber 54 at the time of expansion. The right pillar coverage portion 54a is located on the right pillar coverage portion 53a of the first right chamber 53 when the second right chamber 54 is expanded.

The hood coverage portion 54b extends leftward from a front end section of the right pillar coverage portion 54a in the second right chamber 54 at the time of expansion. The hood coverage portion 54b covers a right section of the rear end portion H1 of the hood HD from the outside when the second right chamber 54 is expanded. Further, the hood coverage portion 54b includes a connection portion 54c that is connected to the gas supply unit 60. As shown in FIG. 8, a gas introduction opening 54d for introducing the gas into the second right chamber 54 is provided on a lower surface of the connection portion 54c.

As shown in FIG. 9, with respect to the forward-rearward direction, the position of a front end of the first right chamber 53 is matched with the position of a front end of the second right chamber 54. On the other hand, with respect to the forward-rearward direction, the position of a rear end of the first right chamber 53 is located at a further rearward position than the position of a rear end of the second right chamber 54. As a result, with respect to the forward-rearward direction (a direction along the extension direction of the front right pillar PR), a length L4 of the second right chamber 54 at the time of expansion is smaller than a length L3 of the first right chamber 53 at the time of expansion.

Further, as shown in FIG. 9, the right pillar coverage portion 54a of the second right chamber 54 at the time of expansion is located on the left side with respect to the vehicle width direction relative to the right pillar coverage portion 53a of the first right chamber 53 at the time of expansion. Further, a rear edge of the hood coverage portion 54b of the second right chamber 54 at the time of expansion is located at a further rearward position than a rear edge of the hood coverage portion 53b of the first right chamber 53 at the time of expansion. That is, the second right chamber 54 at the time of expansion is located at a further middle side of the vehicle M than the first right chamber 53 at the time of expansion.

The gas supply unit 60 selectively supplies the gas for expansion to the first left chamber 51, the second left chamber 52, the first right chamber 53, and the second right chamber 54. As shown in FIG. 8, the gas supply unit 60 includes an inflator accommodation chamber 61, a first inflator 62 (first gas supply portion), a second inflator 63 (second gas supply portion), a first connection chamber 64 (first connection portion), a second connection chamber 65 (second connection portion), a first left chamber expansion opening-closing valve 66 (first opening/closing valve), a second left chamber expansion opening-closing valve 67 (fourth opening/closing valve), a first right chamber expansion opening-closing valve 68 (third opening/closing valve), a second right chamber expansion opening-closing valve 69 (second opening/closing valve), a first outside communication portion 70, and a second outside communication portion 71.

The inflator accommodation chamber 61 is a chamber that accommodates the first inflator 62 and the second inflator 63. The shape of the inflator accommodation chamber 61 may be fixed. The inflator accommodation chamber 61 may be a bag body that is expanded by a gas injected from the first inflator 62 or the second inflator 63.

The inflator accommodation chamber 61 includes an outer shell portion 61a and a partition wall portion 61b that is arranged in an inside space of the outer shell portion 61a. The partition wall portion 61b separates the inside space of the outer shell portion 61a in a rightward-leftward direction. That is, a first inflator accommodation space 61c and a second inflator accommodation space 61d which are partitioned by the partition wall portion 61b is provided inside the outer shell portion 61a. The first inflator 62 is accommodated in the first inflator accommodation space 61c. The second inflator 63 is accommodated in the second inflator accommodation space 61d. The first inflator accommodation space 61c is located on the left side of the second inflator accommodation space 61d. That is, the second inflator accommodation space 61d is located on the right side of the first inflator accommodation space 61c.

A first left chamber communication opening 61e that is in communication with the first left chamber 51, a first connection chamber communication opening 61f that is in communication with the first connection chamber 64, a first outside communication opening 61g that is in communication with an outside space, a first right chamber communication opening 61h that is in communication with the first right chamber 53, a second connection chamber communication opening 61i that is in communication with the second connection chamber 65, and a second outside communication opening 61j that is in communication with the outside space are provided on the outer shell portion 61a.

The first left chamber communication opening 61e is provided on a left side wall of the outer shell portion 61a. The left side wall of the outer shell portion 61a is fixed to the connection portion 51c of the first left chamber 51. The first left chamber communication opening 61e is in communication with the gas introduction opening 51d that is provided on the connection portion 51c. The first left chamber communication opening 61e connects the first inflator accommodation space 61c to an inside space of the first left chamber 51.

The first connection chamber communication opening 61f is provided on a further left section of an upper wall of the outer shell portion 61a than the partition wall portion 61b. The further left section of the upper wall of the outer shell portion 61a than the partition wall portion 61b is fixed to the first connection chamber 64. The first connection chamber communication opening 61f is in communication with a lower communication opening 64a described later that is provided on the first connection chamber 64. The first connection chamber communication opening 61f connects the first inflator accommodation space 61c to an inside space of the first connection chamber 64.

The first outside communication opening 61g is provided on a further left section of a bottom wall of the outer shell portion 61a than the partition wall portion 61b. A lower surface of a bottom wall section of the outer shell portion 61a is exposed. The first outside communication opening 61g connects the first inflator accommodation space 61c to the outside space.

The first right chamber communication opening 61h is provided on a right side wall of the outer shell portion 61a. The right side wall of the outer shell portion 61a is fixed to the connection portion 53c of the first right chamber 53. The first right chamber communication opening 61h is in communication with the gas introduction opening 53d that is provided on the connection portion 53c. The first right chamber communication opening 61h connects the second inflator accommodation space 61d to an inside space of the first right chamber 53.

The second connection chamber communication opening 61i is provided on a further right section of an upper wall of the outer shell portion 61a than the partition wall portion 61b. The further right section of the upper wall of the outer shell portion 61a than the partition wall portion 61b is fixed to the second connection chamber 65. The second connection chamber communication opening 61i is in communication with a lower communication opening 65a described later that is provided on the second connection chamber 65. The second connection chamber communication opening 61i connects the second inflator accommodation space 61d to an inside space of the second connection chamber 65.

The second outside communication opening 61j is provided on a further right section of a bottom wall of the outer shell portion 61a than the partition wall portion 61b. A lower surface of a bottom wall section of the outer shell portion 61a is exposed. The second outside communication opening 61j connects the second inflator accommodation space 61c to the outside space.

The first inflator 62 is located in the first inflator accommodation space 61c of the inflator accommodation chamber 61. The second inflator 63 is located in the second inflator accommodation space 61d of the inflator accommodation chamber 61. The first inflator 62 and the second inflator 63 inject the gas at a predetermined timing under the control of the control device 100. The first left chamber 51, the second left chamber 52, the first right chamber 53, and the second right chamber 54 expand by the gas being supplied. That is, the gas injected from the first inflator 62 and the gas injected from the second inflator 63 are gases for expansion that expand the first left chamber 51, the second left chamber 52, the first right chamber 53, and the second right chamber 54.

In the embodiment, the gas injected from the first inflator 62 is supplied to either the first left chamber 51 or the second right chamber 54. Open/close states of the first left chamber expansion opening-closing valve 66 and the second right chamber expansion opening-closing valve 69 are selected by the control device 100. Thereby, whether the gas injected from the first inflator 62 is supplied to either the first left chamber 51 or the second right chamber 54 is determined. For example, the first left chamber expansion opening-closing valve 66 becomes an open state, the second right chamber expansion opening-closing valve 69 becomes a closed state, and thereby, the gas injected from the first inflator 62 flows into the first left chamber 51. Further, the first left chamber expansion opening-closing valve 66 becomes a closed state, the second right chamber expansion opening-closing valve 69 becomes an open state, and thereby, the gas injected from the first inflator 62 flows into the second right chamber 54.

In the embodiment, the gas injected from the second inflator 63 is supplied to either the second left chamber 52 or the first right chamber 53. Open/close states of the second left chamber expansion opening-closing valve 67 and the first right chamber expansion opening-closing valve 68 are selected by the control device 100. Thereby, whether the gas injected from the second inflator 63 is supplied to either the second left chamber 52 or the first right chamber 53 is determined. For example, the second left chamber expansion opening-closing valve 67 becomes an open state, the first right chamber expansion opening-closing valve 68 becomes a closed state, and thereby, the gas injected from the second inflator 63 flows into the second left chamber 52. Further, the second left chamber expansion opening-closing valve 67 becomes a closed state, the first right chamber expansion opening-closing valve 68 becomes an open state, and thereby, the gas injected from the second inflator 63 flows into the first right chamber 53.

The first connection chamber 64 connects the inflator accommodation chamber 61 to the second right chamber 54. The first connection chamber 64 is fixed to the section of the upper wall of the inflator accommodation chamber 61 further left than the partition wall portion 61b from an upper direction. Further, the first connection chamber 64 is connected to the connection portion Mc of the second right chamber 54 from a lower direction. The shape of the first connection chamber 64 may be fixed. Further, the first connection chamber 64 may be a bag body that is expanded by the gas injected from the first inflator 62.

The lower communication opening 64a is provided on a bottom portion of the first connection chamber 64. The lower communication opening 64a is connected to the first connection chamber communication opening 61f of the inflator accommodation chamber 61. By connecting the lower communication opening 64a to the first connection chamber communication opening 61f, the first inflator accommodation space 61c of the inflator accommodation chamber 61 is in communication with the inside space of the first connection chamber 64.

The second right chamber expansion opening-closing valve 69 is provided at a connection point between the lower communication opening 64a and the first connection chamber communication opening 61f as described later. That is, the second right chamber expansion opening-closing valve 69 is provided on the first connection chamber 64.

Further, an upper communication opening 64b is provided on a ceiling portion of the first connection chamber 64. The ceiling portion of the first connection chamber 64 is fixed to the connection portion 54c of the second right chamber 54. The upper communication opening 64b is connected to the gas introduction opening 54d that is provided on the connection portion 54c. By connecting the upper communication opening 64b to the gas introduction opening 54d, the inside space of the first connection chamber 64 is in communication with the inside space of the second right chamber 54.

The second connection chamber 65 connects the inflator accommodation chamber 61 to the second left chamber 52. The second connection chamber 65 is fixed to the section of the upper wall of the inflator accommodation chamber 61 further right than the partition wall portion 61b from an upper direction. Further, the second connection chamber 65 is connected to the connection portion 52c of the second left chamber 52 from a lower direction. The shape of the second connection chamber 65 may be fixed. Further, the second connection chamber 65 may be a bag body that is expanded by the gas injected from the second inflator 63.

The lower communication opening 65a is provided on a bottom portion of the second connection chamber 65. The lower communication opening 65a is connected to the second connection chamber communication opening 61i of the inflator accommodation chamber 61. By connecting the lower communication opening 65a to the second connection chamber communication opening 61i, the second inflator accommodation space 61d of the inflator accommodation chamber 61 is in communication with the inside space of the second connection chamber 65.

The second left chamber expansion opening-closing valve 67 is provided at a connection point between the lower communication opening 65a and the second connection chamber communication opening 61i as described later. That is, the second left chamber expansion opening-closing valve 67 is provided on the second connection chamber 65.

Further, an upper communication opening 65b is provided on a ceiling portion of the second connection chamber 65. The ceiling portion of the second connection chamber 65 is fixed to the connection portion 52c of the second left chamber 52. The upper communication opening 65b is connected to the gas introduction opening 52d that is provided on the connection portion 52c. By connecting the upper communication opening 65b to the gas introduction opening 52d, the inside space of the second connection chamber 65 is in communication with the inside space of the second left chamber 52.

Each of the first left chamber expansion opening-closing valve 66, the second left chamber expansion opening-closing valve 67, the first right chamber expansion opening-closing valve 68, the second right chamber expansion opening-closing valve 69, the first outside communication portion 70, and the second outside communication portion 71 is an active vent of which an open state and a closed state are selected by the control device 100. In the open state, the gas can pass. In the closed state, the gas cannot pass. For example, a state of each of the first left chamber expansion opening-closing valve 66, the second left chamber expansion opening-closing valve 67, the first right chamber expansion opening-closing valve 68, the second right chamber expansion opening-closing valve 69, the first outside communication portion 70, and the second outside communication portion 71 transfers from the closed state to the open state by a tether being disconnected under the control of the control device 100.

The first left chamber expansion opening-closing valve 66 is located at a connection point between the first left chamber communication opening 61e of the inflator accommodation chamber 61 and the gas introduction opening 51d of the first left chamber 51. That is, the first left chamber expansion opening-closing valve 66 is located between the first inflator 62 and the first left chamber 51. The first left chamber expansion opening-closing valve 66 becomes the open state, and thereby, the gas injected from the first inflator 62 can flow from the first inflator accommodation space 61*c* into the first left chamber 51.

In the embodiment, two second left chamber expansion opening-closing valve 67 are provided. One second left chamber expansion opening-closing valve 67 is located at a connection point between the second connection chamber communication opening 61*i* of the inflator accommodation chamber 61 and the lower communication opening 65*a* of the second connection chamber 65. The other second left chamber expansion opening-closing valve 67 is located at a connection point between the upper communication opening 65*b* of the second connection chamber 65 and the gas introduction opening 52*d* of the second left chamber 52.

That is, the second left chamber expansion opening-closing valves 67 are located between the second inflator 63 and the second left chamber 52. The second left chamber expansion opening-closing valves 67 becomes the open state, and thereby, the gas injected from the second inflator 63 can flow from the second inflator accommodation space 61*d* into the second left chamber 52.

The first right chamber expansion opening-closing valve 68 is located at a connection point between the first right chamber communication opening 61*h* of the inflator accommodation chamber 61 and the gas introduction opening 53*d* of the first right chamber 53. That is, the first right chamber expansion opening-closing valve 68 is located between the second inflator 63 and the first right chamber 53. The first right chamber expansion opening-closing valves 68 become the open state, and thereby, the gas injected from the second inflator 63 can flow from the second inflator accommodation space 61*d* into the first right chamber 53.

In the embodiment, two second right chamber expansion opening-closing valves 69 are provided. One second right chamber expansion opening-closing valve 69 is located at a connection point between the first connection chamber communication opening 61*f* of the inflator accommodation chamber 61 and the lower communication opening 64*a* of the first connection chamber 64. The other second right chamber expansion opening-closing valve 69 is located at a connection point between the upper communication opening 64*b* of the first connection chamber 64 and the gas introduction opening 54*d* of the second right chamber 54.

That is, the second right chamber expansion opening-closing valves 69 are located between the first inflator 62 and the second right chamber 54. The second right chamber expansion opening-closing valves 69 become the open state, and thereby, the gas injected from the first inflator 62 can flow from the first inflator accommodation space 61*c* into the second right chamber 54.

The first outside communication portion 70 is located at the first outside communication opening 61*g* of the inflator accommodation chamber 61. The first outside communication portion 70 becomes the open state, and thereby, the gas inside the first inflator accommodation space 61*c* is discharged to the outside of the airbag apparatus 50. In the embodiment, in a state where the gas injected from the first inflator 62 is filled in the first left chamber 51, the control device 100 causes the first outside communication portion 70 to become the open state at a predetermined timing. Therefore, the gas inside the first left chamber 51 is discharged through the first outside communication portion 70 by the first outside communication portion 70 becoming the open state. That is, the first outside communication portion 70 can discharge the gas inside the expanded first left chamber 51 to the outside.

The second outside communication portion 71 is located at the second outside communication opening 61*j* of the inflator accommodation chamber 61. The second outside communication portion 71 becomes the open state, and thereby, the gas inside the second inflator accommodation space 61*d* is discharged to the outside of the airbag apparatus 50. In the embodiment, in a state where the gas injected from the second inflator 63 is filled in the first right chamber 53, the control device 100 causes the second outside communication portion 71 to become the open state at a predetermined timing. Therefore, the gas inside the first right chamber 53 is discharged through the second outside communication portion 71 by the second outside communication portion 71 becoming the open state. That is, the second outside communication portion 71 can discharge the gas inside the expanded first right chamber 53 to the outside.

The airbag apparatus 50 may include a pop-up hood system (hereinafter, referred to as a PUH system) in addition to the configuration described above. The PUH system includes a mechanism that lifts the hood HD upward when the vehicle M comes into contact with an object (for example, a pedestrian, a cyclist, or a rider). Thereby, it is possible to provide a space with an engine or the like that is provided on the vehicle M and reduce a load (an impact or the like) on a head portion or the like of the pedestrian or the like. The PUH system is operated, for example, by a control of an airbag control portion 130 described later.

[Control Device]

As shown in FIG. 1, the control device 100 includes, for example, a recognition portion 110, a contact determination portion 120 (prediction portion), the airbag control portion 130 (expansion control portion), and a storage portion 140. Each of the recognition portion 110, the contact determination portion 120, and the airbag control portion 130 is realized, for example, by a hardware processor such as a CPU (Central Processing Unit) executing a program (software). Some or all of these components may be realized by hardware (a circuit portion including circuitry) such as a LSI (Large Scale Integration), an ASIC (Application Specific Integrated Circuit), a FPGA (Field-Programmable Gate Array), and a GPU (Graphics Processing Unit), or may be realized by software and hardware in cooperation. The program may be stored in a storage device (a storage device that includes a non-transitory storage medium) such as a flash memory or an HDD (Hard Disk Drive) of the control device 100 in advance. The program may be stored in a detachable storage medium such as a DVD or a CD-ROM and may be installed in the flash memory or the HDD of the control device 100 by the storage medium (non-transitory storage medium) being mounted in a drive device.

The recognition portion 110 recognizes a periphery situation of the vehicle M on the basis of information that is input from the camera 10, the radar device 12, and the LIDAR 14. The periphery of the vehicle M is, for example, a range within a predetermined distance around the vehicle M. For example, the recognition portion 110 recognizes the type and the position of an object that is present in the periphery of the vehicle M. The recognition portion 110 recognizes a state such as a speed, an acceleration, and a movement direction of the object. The position of the object is, for example, recognized as a position on absolute coordinates having the origin at a representative point (a center of gravity, a center of a drive axis, or the like) of the vehicle M and is used for control. The position of the object may be represented by a representative point such as a center of gravity or a corner of the object or may be represented by a represented area.

A "state" of the object may include the acceleration or the jerk of the object, or an "action state" (for example, whether or not a lane is being changed or is intended to be changed), for example, when the object is a mobile object such as another vehicle.

The object includes, for example, a traffic participant, a peripheral vehicle, a road structure, and the like. The traffic participant includes, for example, at least a pedestrian and may include a person who rides on a wheelchair. The following embodiment is described using an example in which the traffic participant is a pedestrian. The peripheral vehicle (other vehicle) includes at least a vehicle on which a person rides in a state where the body is exposed to the outside. The vehicle on which a person rides in a state where the body is exposed to the outside includes at least a bicycle and a motorcycle and may include a kickboard, an electric kickboard, a skateboard, or an electric stand-riding motorcycle. The following embodiment is described using an example in which the peripheral vehicle (other vehicle) is a bicycle. The road structure includes, for example, a road sign, a traffic signal, a rail crossing, a curbstone, a center divider, a guardrail, a fence, and the like. The road structure may include, for example, a road surface sign such as a road compartment line, a pedestrian crossing, a bicycle crossing zone, or a temporary stop line that is drawn or attached to the road surface. The object may include an obstacle such as a fallen object (for example, a load of the other vehicle or a signboard that was installed around the road) on the road.

The recognition portion 110 recognizes a risk object, for example, on the basis of feature information such as the shape, the contour, the size, the color, and the like of the object included in a captured image of the camera 10. The risk object is, for example, an external mobile object, that is, a traffic participant or another mobile object. Specifically, the risk object is a pedestrian, a peripheral vehicle on which a person rides, or the like. In addition, the risk object may include a static obstacle such as, for example, an abandoned object, a parked vehicle, or a utility pole. The phrase "recognize a risk object" means recognizing the existence of the risk object classified as described above and the relative position of the risk object relative to the vehicle M. When information of the type of the object is input together with information of the position of the object from the outside, the recognition portion 110 may recognize the risk object with reference to the type of object. The recognition portion 110 may analyze the image captured by the camera 10 and recognize the risk object. The recognition portion 110 may recognize the risk object on the basis of the speed of the object, the reflectivity of electromagnetic waves, or the like. In the embodiment, as described above, the traffic participant is a pedestrian, and the peripheral vehicle is a bicycle. Accordingly, in the embodiment, the recognition portion 110 recognizes the pedestrian and the bicycle as at least the risk object.

For example, the recognition portion 110 inputs the captured image into a DNN (deep neural network) that has learned to output the position (contour) in the captured image when the type of the risk object is input. The recognition portion 110 sets a circumscribed rectangle (bounding box) of the output contour and acquires the position (a position not on an image plane but on a plane seen from the above) of the risk object from the position of the lower side. Thereby, it is possible to know the distance and the orientation of the risk object. Further, the recognition portion 110 can acquire the height of the risk object height on the basis of the position of the risk object and the height of the bounding box.

The contact determination portion 120 determines whether or not the vehicle M comes into contact with the object on the basis of the recognition result of the recognition portion 110. That is, the contact determination portion 120 predicts a collision between the risk object and the vehicle M. For example, the contact determination portion 120 determines whether or not the vehicle M and the risk object come into contact with each other based on a future travel prediction trajectory based on the position and the speed of the vehicle M and a future prediction trajectory based on the position and the speed of the risk object. Further, the contact determination portion 120 may determine whether or not the vehicle M and the risk object have been in contact with each other based on the detection result of the contact sensor 42 or the like. Further, the contact determination portion 120 may determine whether or not the vehicle M and the risk object have been in contact with each other based on the amount of change in acceleration of the vehicle M detected by the acceleration sensor.

Further, the contact determination portion 120 determines that the vehicle M and the risk object come into contact (or have been in contact) with each other and predicts the position (collision position) and the time (collision time) at which a head portion of a person included in the risk object collides with the vehicle M. For example, when it is predicted that the pedestrian will collide with the vehicle M, the contact determination portion 120 predicts the time at which the head portion of the pedestrian collides with the vehicle M on the basis of body information of the pedestrian and the speed of the vehicle. Further, for example, when it is predicted that the bicycle will collide with the vehicle M, the contact determination portion 120 predicts the time at which the head portion of a person who rides on the bicycle collides with the vehicle M on the basis of the relative speed between the bicycle and the vehicle.

Figure 10:
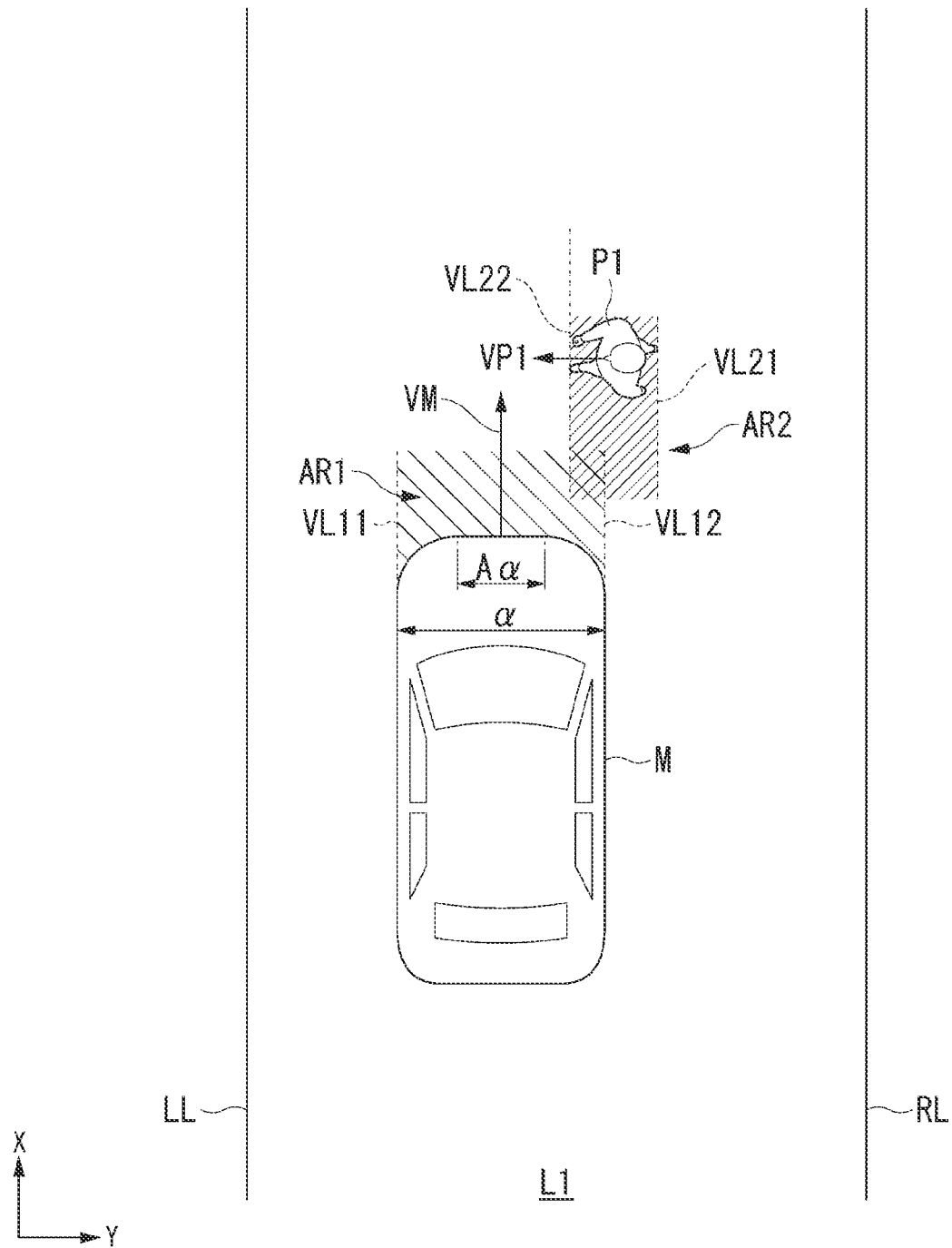
FIG. 10 is a view for describing a contact determination portion when a risk object is a pedestrian.

FIG. 10 is a view for describing the contact determination portion 120 when the risk object is a pedestrian P1. In the example of FIG. 10, the vehicle M is traveling in a proceeding direction at a speed VM on a road L1 that extends in a X-axis direction in the drawing. The pedestrian P1 is present in the proceeding direction of the vehicle M. The pedestrian P1 is walking (walking across the road L1) at a speed VP1 from a road compartment line RL toward a road compartment line LL (road width direction, −Y-axis direction). FIG. 10 shows a view (a figure of a top view image) in which, for example, a three-dimensional image captured by the camera 10 is converted into an XY-plane coordinate.

For example, the contact determination portion 120 sets a future travel prediction trajectory of the vehicle M when it is assumed that the speed VM and the steering angle of the vehicle M are constant on the basis of the position and the speed VM of the vehicle M in a time series. In the example of FIG. 10, an area AR1 that is interposed by two virtual lines VL11 and VL12 that extend from right and left ends of the vehicle M in a central axis direction of the vehicle M to a forward direction of the vehicle M is set as a travel prediction trajectory. The distance between the right and left ends of the vehicle M corresponds to, for example, a vehicle width a. The travel prediction trajectory may be set to have a bend, for example, in consideration of a steering angle or the like. Further, the contact determination portion 120 derives a future prediction trajectory of the pedestrian P1 when it is assumed that the speed VP1 and the movement direction are constant on the basis of the position and the speed VP1 of the pedestrian P1 in a time series. Then, the contact determination portion 120 determines that the vehicle M and the pedestrian P1 come into contact with each other when the position of the pedestrian P1 is within the area AR1 at the time when it is predicted that the vehicle M reaches the position (position on the X-axis) where the pedestrian P1 is present. The contact determination portion 120 determines that the vehicle M and the pedestrian P1 do not come into contact with each other when the position of the pedestrian P1 is not within the area AR1 at the time when it is predicted that the vehicle M reaches the position (position on the X-axis) where the pedestrian P1 is present.

Further, the contact determination portion 120 may determine that the vehicle M and the pedestrian P1 have been in contact with each other when a load of a predetermined value or more is detected by the contact sensor 42. The contact determination portion 120 may determine that the vehicle M and the pedestrian P1 have been in contact with each other when a deceleration amount of a predetermined amount or more is detected by the acceleration sensor.

For example, when it is determined that the vehicle M and the pedestrian P1 come into contact with each other, the contact determination portion 120 derives the collision time and the collision position of the head portion of the pedestrian P1 on the basis of the speed VM of the vehicle M and the body information of the pedestrian P1. The body information is information that includes the physical characteristics of the pedestrian P1 and includes, for example, the height of pedestrian P1. The contact determination portion 120 may predict that a time at which the head portion collides with the vehicle M is later as the head portion position of the pedestrian P1 is higher. The contact determination portion 120 may predict that a time at which the head portion collides with the vehicle M is earlier as the speed VM of the vehicle M is faster. For example, the storage portion 140 stores map data indicating the relationship between the body information of the pedestrian P1, and the collision time and the collision position of the head portion in advance. The contact determination portion 120 derives the collision time and the collision position of the head portion, for example, with reference to the map data described above.

The contact determination portion 120 may determine whether or not the collision position of the head portion of the pedestrian P1 is, with respect to the vehicle width direction, within a predetermined threshold value from the outermost side of the vehicle M in the vehicle width direction. That is, the contact determination portion 120 may determine whether or not the collision position of the head portion of the pedestrian P1 is in a middle range Act in the vehicle width direction.

Figure 11:
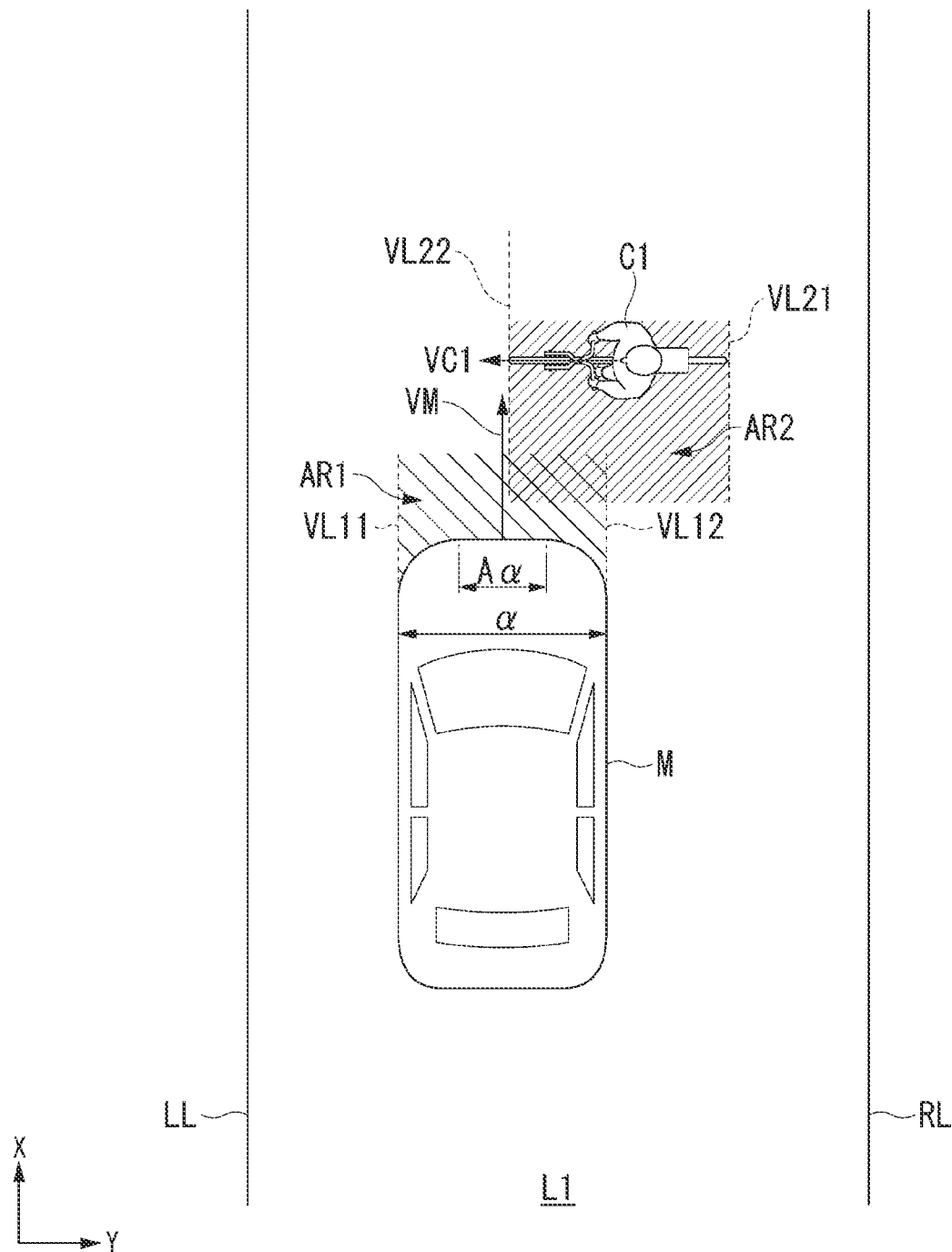
FIG. 11 is a view for describing the contact determination portion when the risk object is a bicycle.

FIG. 11 is a view for describing the contact determination portion 120 when the risk object is a bicycle C1. In the example of FIG. 11, the vehicle M is traveling in a proceeding direction at a speed VM on a road L1 that extends in a X-axis direction in the drawing. The bicycle C1 is present in the proceeding direction of the vehicle M. The bicycle C1 is traveling (traveling across the road L1) at a speed VC1 from a road compartment line RL toward a road compartment line LL (road width direction, −Y-axis direction). FIG. 11 shows a view (a figure of a top view image) in which, for example, a three-dimensional image captured by the camera 10 is converted into an XY-plane coordinate.

For example, the contact determination portion 120 sets a future travel prediction trajectory of the vehicle M similarly to the case in which the risk object is the pedestrian P1. Further, the contact determination portion 120 derives a future prediction trajectory of the bicycle C1 when it is assumed that the speed VC1 and the movement direction are constant on the basis of the position and the speed VC1 of the bicycle C1 in a time series. Then, the contact determination portion 120 determines that the vehicle M and the bicycle C1 come into contact with each other when the position of the bicycle C1 is within the area AR1 at the time when it is predicted that the vehicle M reaches the position (position on the X-axis) where the bicycle C1 is present. The contact determination portion 120 determines that the vehicle M and the bicycle C1 do not come into contact with each other when the position of the bicycle C1 is not within the area AR1 at the time when it is predicted that the vehicle M reaches the position (position on the X-axis) where the bicycle C1 is present.

Further, the contact determination portion 120 may determine that the vehicle M and the bicycle C1 have been in contact with each other when a load of a predetermined value or more is detected by the contact sensor 42. The contact determination portion 120 may determine that the vehicle M and the bicycle C1 have been in contact with each other when a deceleration amount of a predetermined amount or more is detected by the acceleration sensor.

For example, when it is determined that the vehicle M and the bicycle C1 come into contact with each other, the contact determination portion 120 derives the collision time and the collision position of the head portion of a person who rides on the bicycle C1 on the basis of the position (for example, the height from the ground) of the head portion of the person who rides on the bicycle C1 and the relative speed between the speed VM of the vehicle M and the speed VC1 of the bicycle C1. The contact determination portion 120 may predict that a time at which the head portion collides with the vehicle M is later as the position of the head portion of the person who rides on the bicycle C1 is higher. The contact determination portion 120 may predict that a time at which the head portion collides with the vehicle M is earlier as the relative speed between the vehicle M and the bicycle C1 is faster. For example, the storage portion 140 stores map data indicating the relationship between the position of the head portion of a person who rides on the bicycle C1, and the collision time and the collision position of the head portion in advance. Further, the storage portion 140 stores, for example, map data indicating the relationship between the relative speed between the vehicle M and the bicycle C1, and the collision time and the collision position of the head portion in advance. The contact determination portion 120 derives the collision time and the collision position of the head portion, for example, with reference to the map data described above.

Further, there may be cases in which a plurality of risk objects recognized by the recognition portion 110 are present. When there is a plurality of risk objects recognized by the recognition portion 110 are present, the contact determination portion 120 may determine whether or not each risk object comes into contact with the vehicle M. That is, the contact determination portion 120 may determine that a plurality of risk objects simultaneously come into contact with the vehicle M.

The airbag control portion 130 shown in FIG. 1 performs an expansion control of the airbag apparatus 50, for example, on the condition that it is determined that the vehicle M comes into contact with an object by the contact determination portion 120. The airbag control portion 130 performs the expansion control of the airbag apparatus 50, for example, on the condition that a detection value detected by the contact sensor 42 exceeds a preset threshold value (hereinafter, referred to as an airbag apparatus expansion threshold value). In the embodiment, the airbag control portion 130 performs the expansion control of the airbag apparatus 50 on the condition that it is determined that the vehicle M comes into contact with an object by the contact determination portion 120 and that the detection value detected by the contact sensor 42 is equal to or more than the airbag apparatus expansion threshold value.

The expansion control is a control that selectively expands the first left chamber 51, the second left chamber 52, the first right chamber 53, and the second right chamber 54. In the embodiment, the airbag control portion 130 performs the expansion control of the airbag apparatus 50 in accordance with a severity-low mode, a severity-high mode, and a two-side expansion mode.

The severity-low mode is, for example, a mode in which a collision of a risk object can be predicted, and it is possible to determine that a collision energy of the risk object is lower than a predetermined threshold value. In the embodiment, the airbag control portion 130 expands any one of the first left chamber 51 and the first right chamber 53 in the case of the severity-low mode. The airbag control portion 130 may perform the expansion control of the airbag apparatus 50 in accordance with the severity-low mode, for example, when the risk object is the pedestrian P1, the speed VM of the vehicle M is equal to or less than a predetermined speed (severity determination threshold value), and the collision position of the head portion of the pedestrian P1 is equal to or less than 20% of the vehicle width from the outermost side in the vehicle width direction of the vehicle M.

The severity-high mode is, for example, a mode in which a collision of a risk object can be predicted, and it is possible to determine that a collision energy of the risk object is higher than a predetermined threshold value. In the embodiment, the airbag control portion 130 expands the first left chamber 51 and the second left chamber 52, or the first right chamber 53 and the second right chamber 54 in the case of the severity-high mode. The airbag control portion 130 may perform the expansion control of the airbag apparatus 50 in accordance with the severity-high mode, for example, when the risk object is the bicycle C1. The airbag control portion 130 may perform the expansion control of the airbag apparatus 50 in accordance with the severity-high mode, for example, when the risk object is the pedestrian P1, and the speed VM of the vehicle M is faster than a predetermined speed (severity determination threshold value).

The two-side expansion mode is, for example, a mode that does not fall into any of the severity-low mode and the severity-high mode. In the embodiment, the airbag control portion 130 expands the first left chamber 51 and the first right chamber 53 in the case of the two-side expansion mode. The airbag control portion 130 may perform the expansion control of the airbag apparatus 50 in accordance with the two-side expansion mode, for example, when a detection value equal to or more than the airbag apparatus expansion threshold value is input from the contact sensor 42 without recognizing the risk object. The airbag control portion 130 may perform the expansion control of the airbag apparatus 50 in accordance with the two-side expansion mode, for example, when the risk object is the pedestrian P1, and the collision position of the head portion of the pedestrian P1 is not equal to or less than 20% of the vehicle width from the outermost side in the vehicle width direction of the vehicle M. The airbag control portion 130 may perform the expansion control of the airbag apparatus 50 in accordance with the two-side expansion mode, for example, when it is predicted that a plurality of risk objects collide with the vehicle M.

Further, in a case where the contact determination portion 120 predicts the collision position of the risk object in the vehicle M, when the collision position is a left side with respect to the vehicle width direction of the vehicle M, the airbag control portion 130 may expand only the first left chamber 51, or the first left chamber 51 and the second left chamber 52. For example, the airbag control portion 130 expands only the first left chamber 51 in the case of the severity-low mode and when the collision position is the left side with respect to the vehicle width direction of the vehicle M. On the other hand, for example, the airbag control portion 130 expands the first left chamber 51 and the second left chamber 52 in the case of the severity-high mode and when the collision position is the left side with respect to the vehicle width direction of the vehicle M.

Further, in a case where the contact determination portion 120 predicts the collision position of the risk object in the vehicle M, when the collision position is a right side with respect to the vehicle width direction of the vehicle M, the airbag control portion 130 may expand only the first right chamber 53, or the first right chamber 53 and the second right chamber 54. For example, the airbag control portion 130 expands only the first right chamber 53 in the case of the severity-low mode and when the collision position is the right side with respect to the vehicle width direction of the vehicle M. On the other hand, for example, the airbag control portion 130 expands the first right chamber 53 and the second right chamber 54 in the case of the severity-high mode and when the collision position is the right side with respect to the vehicle width direction of the vehicle M.

Further, when the recognition portion 110 recognizes the pedestrian P1 as the risk object, the contact determination portion 120 predicts the collision between the pedestrian P1 and the vehicle M, and the speed VM of the vehicle M is in a first speed range which is a speed range equal to or less than the severity determination threshold value, the airbag control portion 130 may expand the first left chamber 51 or the first right chamber 53 in accordance with the collision position. For example, the airbag control portion 130 expands the first left chamber 51 when the collision position is the left side with respect to the vehicle width direction of the vehicle M. On the other hand, for example, the airbag control portion 130 expands the first right chamber 53 when the collision position is the right side with respect to the vehicle width direction of the vehicle M.

Further, when the recognition portion 110 recognizes the pedestrian P1 as the risk object, the contact determination portion 120 predicts the collision between the pedestrian P1 and the vehicle M, and the speed VM of the vehicle M is in a second speed range (a speed range on a higher speed side than the first speed range) which is a faster speed range than the severity determination threshold value, the airbag control portion 130 expands both the first left chamber 51 and the second left chamber 52, or both the first right chamber 53 and the second right chamber 54 in accordance with the collision position.

Further, the airbag control portion 130 may lower the airbag apparatus expansion threshold value when the risk object is the pedestrian P1 and the speed VM of the vehicle M is in a low-speed range in the first speed range. For example, in a case where the same airbag apparatus expansion threshold value is used for the airbag apparatus 50 and a vehicle interior airbag apparatus (not shown) that is provided in the interior of the vehicle M, it is conceivable that when the collision energy is a collision energy that does not require expansion of the vehicle interior airbag apparatus, the airbag apparatus 50 is not also expanded. That is, it is conceivable that when a pedestrian P1 having a small speed energy is the risk object, and the speed VM of the vehicle M is slow, the airbag apparatus 50 is not also expanded in accordance with the vehicle interior airbag apparatus. Accordingly, the airbag control portion 130 lowers the airbag apparatus expansion threshold value used for the expansion control of the airbag apparatus 50 in isolation from the airbag apparatus expansion threshold value used for the expansion control of the vehicle interior airbag apparatus. Thereby, even when the collision energy is a collision energy that does not require expansion of the vehicle interior airbag apparatus, the airbag apparatus 50 can be expanded in isolation from vehicle interior airbag apparatus.

Further, there may be cases in which a different vehicle sensor 40 is provided on the vehicle interior airbag apparatus and the airbag apparatus 50, and a different airbag apparatus expansion threshold value is used for each of the vehicle interior airbag apparatus and the airbag apparatus 50. Even in such cases, the airbag apparatus expansion threshold value may be lowered when the risk object is the pedestrian P1 and the speed VM of the vehicle M is in the low speed range in the first speed range. For example, there may be cases in which the airbag apparatus expansion threshold value is a value that prevents expansion of the airbag apparatus 50 by the impact at the time of traveling on a rough road or the like. In this case, when the pedestrian P1 having a small speed energy is the risk object and the speed VM of the vehicle M is slow, it is conceivable that the collision energy is small and the airbag apparatus 50 is not also expanded. Accordingly, the airbag control portion 130 may lower the airbag apparatus expansion threshold value used for the expansion control of the airbag apparatus 50 to a value of the case in which the risk object is the pedestrian P1 and the speed VM of the vehicle M is in the low speed range in the first speed range. Thereby, even in the case where the risk object is the pedestrian P1 and the speed VM of the vehicle M is in the low speed range in the first speed range, the airbag apparatus 50 can be expanded, and it is possible to further relieve the impact on the pedestrian P1.

Further, when the risk object is the bicycle C1, there may be cases in which the collision energy is small depending on the position where the vehicle M collides. Therefore, the airbag control portion 130 may lower the airbag apparatus expansion threshold value used for the expansion control of the airbag apparatus 50 to a value of the case in which the risk object is the bicycle C1. Thereby, even in the case where the risk object is the bicycle C1 and the collision energy is small, the airbag apparatus 50 can be expanded, and it is possible to further relieve the impact on the person who rides on the bicycle C1.

Further, when a collision time of the head portion of the pedestrian P1 or a collision time of the head portion of the person who rides on the bicycle C1 is derived by the contact determination portion 120, the airbag control portion 130 may perform the expansion control in accordance with the derived collision time. For example, the airbag control portion 130 performs the expansion control of the airbag apparatus 50 in accordance with the collision time so as to relieve the impact on the head portion of the pedestrian P1 or the impact on the head portion of the person who rides on the bicycle C1.

Further, when the collision position of the pedestrian P1 in the vehicle M is in the preset middle range (for example, a range in which the collision position is not equal to or less than 20% of the vehicle width from the outermost side in the vehicle width direction of the vehicle M) in the vehicle width direction, the airbag control portion 130 may expand at least the first left chamber 51 and the first right chamber 53.

Further, when the contact determination portion 120 predicts the collision between the bicycle C1 and the vehicle M, the airbag control portion 130 may expand, in accordance with the collision position, the first left chamber 51 and the second left chamber 52, or the first right chamber 53 and the second right chamber 54. That is, when it is predicted that the bicycle C1 collides with the vehicle M, regardless of the speed VM of the vehicle M, the airbag control portion 130 may expand the first left chamber 51 and the second left chamber 52, or the first right chamber 53 and the second right chamber 54. For example, the airbag control portion 130 expands the first left chamber 51 and the second left chamber 52 when the collision position is the left side with respect to the vehicle width direction of vehicle M. On the other hand, for example, the airbag control portion 130 expands the first right chamber 53 and the second right chamber 54 when the collision position is the right side with respect to the vehicle width direction of the vehicle M.

Further, when the first left chamber 51 is expanded, the airbag control portion 130 may reduce an internal pressure of the first left chamber 51 in accordance with a timing when the risk object comes into contact with the first left chamber 51. For example, the airbag control portion 130 reduces the internal pressure of the first left chamber 51 so as to prevent the risk object from rebounding due to a reaction force received from the first left chamber 51 when the risk object collides with the expanded first left chamber 51. For example, the airbag control portion 130 causes the first outside communication portion 70 to be in the open state at a timing that is the same as the timing when the risk object collides with the expanded first left chamber 51, or at a slightly later timing than the timing when the risk object collides with the expanded first left chamber 51.

For example, the airbag control portion 130 reduces the internal pressure of the first right chamber 53 so as to prevent the risk object from rebounding due to the reaction force received from the first right chamber 53 when the risk object collides with the expanded first right chamber 53. For example, the airbag control portion 130 causes the second outside communication portion 71 to be in the open state at a timing that is the same as the timing when the risk object collides with the expanded first right chamber 53, or at a slightly later timing than the timing when the risk object collides with the expanded first right chamber 53.

Further, when the contact determination portion 120 predicts that there are a plurality of risk objects that collide with the vehicle M, the airbag control portion 130 may expand the first left chamber and the first right chamber in accordance with the two-side expansion mode. Further, when the contact determination portion 120 cannot predict the collision position of the risk object in the vehicle M, the airbag control portion 130 may expand the first left chamber and the first right chamber in accordance with the two-side expansion mode.

The storage portion 140 may be realized by the various storage devices described above, a SSD (Solid State Drive), an EEPROM (Electrically Erasable Programmable Read Only Memory), a ROM (Read Only Memory), a RAM (Random Access Memory) or the like. The storage portion 140 stores, for example, information required for executing various controls such as the airbag control in the embodiment, a program, various other information, and the like.

In the embodiment, the control device 100 includes a computer. A program P that performs the expansion control of the airbag apparatus 50 is stored in the storage portion 140. The program P causes the computer to recognize the risk object that is present in the vicinity of the vehicle M. Further, the program P causes the computer to predict a collision between the risk object and the vehicle M. Further, the program P causes the computer to perform the expansion control of the first left chamber 51, the second left chamber 52, the first right chamber 53, and the second right chamber 54 on the basis of the prediction described above.

[Airbag System]

As shown in FIG. 1, in an embodiment, the vehicle system 1 includes the airbag system 200. The airbag system 200 includes the airbag apparatus 50 described above and the control device 100. That is, the airbag system 200 includes the first left chamber 51 that is expandable so as to cover the outer surface of the front left pillar PL which is located on a left side with respect to the vehicle width direction of the vehicle M. Further, the airbag system 200 includes the second left chamber 52 that is expandable on the first left chamber 51. Further, the airbag system 200 includes the first right chamber 53 that is expandable so as to cover the outer surface of the front right pillar PR which is located on a right side with respect to the vehicle width direction of the vehicle M. Further, the airbag system 200 includes the second right chamber 54 that is expandable on the first right chamber 53. Further, the airbag system 200 includes the recognition portion 110 that recognizes a risk object which is present in the vicinity of the vehicle M. Further, the airbag system 200 includes the contact determination portion 120 that predicts a collision between the risk object and the vehicle M. Further, the airbag system 200 includes the airbag control portion 130 that performs the expansion control of the first left chamber 51, the second left chamber 52, the first right chamber 53, and the second right chamber 54 on the basis of the prediction of the contact determination portion 120.

In the airbag system 200, as shown in FIG. 1, the airbag control portion 130 is connected to the first inflator 62, the second inflator 63, the first left chamber expansion opening-closing valve 66, the second left chamber expansion opening-closing valve 67, the first right chamber expansion opening-closing valve 68, the second right chamber expansion opening-closing valve 69, the first outside communication portion 70, and the second outside communication portion 71.

Figure 12:
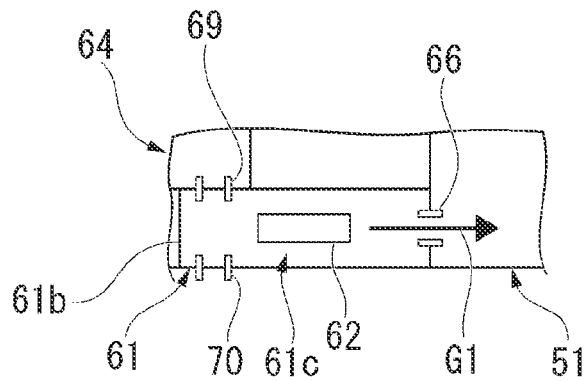
FIG. 12 is a schematic view showing a gas flow when only the first left chamber is expanded.

For example, when only the first left chamber 51 is expanded, the airbag control portion 130 causes the first left chamber expansion opening-closing valve 66 to become the open state and causes the first inflator 62 to inject a gas. FIG. 12 is a schematic view showing a gas flow when only the first left chamber 51 is expanded. As shown in FIG. 12, a gas G1 injected from the first inflator 62 passes through the first left chamber expansion opening-closing valve 66 and flows into the first left chamber 51. As a result, as shown in FIG. 2, the first left chamber 51 is expanded.

Figure 13:
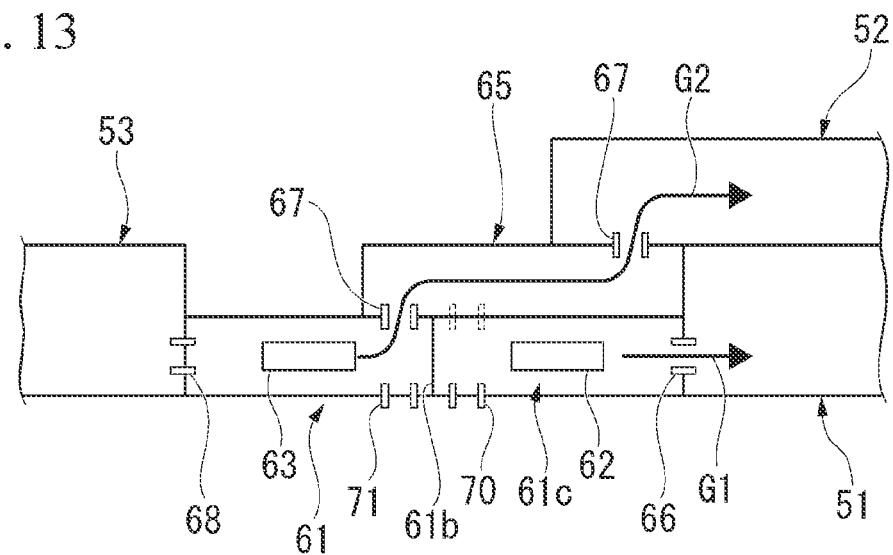
FIG. 13 is a schematic view showing a gas flow when the first left chamber and the second left chamber are expanded.

For example, when the first left chamber 51 and the second left chamber 52 are expanded, the airbag control portion 130 causes the first left chamber expansion opening-closing valve 66 and the second left chamber expansion opening-closing valve 67 to become the open state and causes the first inflator 62 and the second inflator 63 to inject a gas. FIG. 13 is a schematic view showing a gas flow when the first left chamber 51 and the second left chamber 52 are expanded. As shown in FIG. 13, a gas G1 injected from the first inflator 62 passes through the first left chamber expansion opening-closing valve 66 and flows into the first left chamber 51. Further, a gas G2 injected from the second inflator 63 passes through two second left chamber expansion opening-closing valves 67 and the second connection chamber 65 and flows into the second left chamber 52. As a result, as shown in FIG. 3, the first left chamber 51 and the second left chamber 52 are expanded.

For example, when the gas inside the expanded first left chamber 51 is discharged to the outside of the airbag apparatus 50, the airbag control portion 130 causes the first outside communication portion 70 to become the open state.

Figure 14:
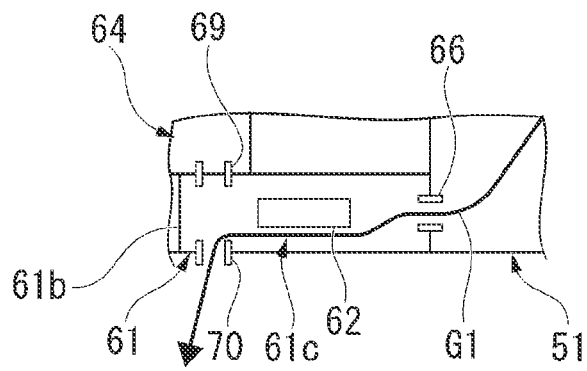
FIG. 14 is a schematic view showing a gas flow when a gas in the expanded first left chamber is discharged to the outside of the airbag apparatus.

FIG. 14 is a schematic view showing a gas flow when the gas inside the expanded first left chamber 51 is discharged to the outside of the airbag apparatus 50. As shown in FIG. 14, the gas G1 inside the expanded first left chamber 51 passes through the first left chamber expansion opening-closing valve 66, the first inflator accommodation space 61*c*, and the first outside communication portion 70 and is discharged to the outside of the airbag apparatus 50.

Figure 15:
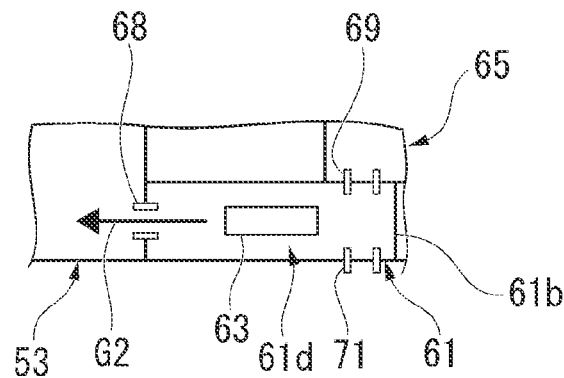
FIG. 15 is a schematic view showing a gas flow when only the first right chamber is expanded.

For example, when only the first right chamber 53 is expanded, the airbag control portion 130 causes the first right chamber expansion opening-closing valve 68 to become the open state and causes the second inflator 63 to inject a gas. FIG. 15 is a schematic view showing a gas flow when only the first right chamber 53 is expanded. As shown in FIG. 15, a gas G2 injected from the second inflator 63 passes through the first right chamber expansion opening-closing valve 68 and flows into the first right chamber 53. As a result, as shown in FIG. 4, the first right chamber 53 is expanded.

Figure 16:
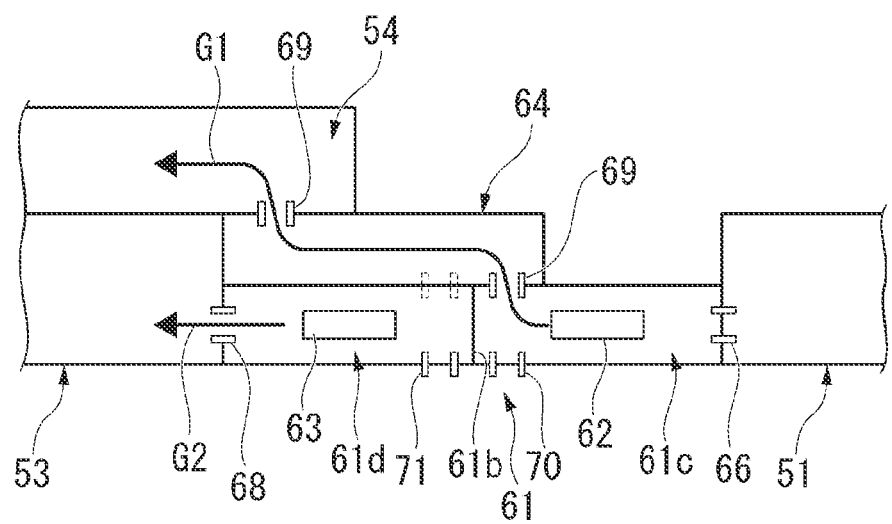
FIG. 16 is a schematic view showing a gas flow when the first right chamber and the second right chamber are expanded.

For example, when the first right chamber 53 and the second right chamber 54 are expanded, the airbag control portion 130 causes the first right chamber expansion opening-closing valve 68 and the second right chamber expansion opening-closing valve 69 to become the open state and causes the first inflator 62 and the second inflator 63 to inject a gas. FIG. 16 is a schematic view showing a gas flow when the first right chamber 53 and the second right chamber 54 are expanded. As shown in FIG. 16, a gas G2 injected from the second inflator 63 passes through the first right chamber expansion opening-closing valve 68 and flows into the first right chamber 53. Further, a gas G1 injected from the first inflator 62 passes through two second right chamber expansion opening-closing valves 69 and the first connection chamber 64 and flows into the second right chamber 54. As a result, as shown in FIG. 5, the first right chamber 53 and the second right chamber 54 are expanded.

For example, when the gas inside the expanded first right chamber 53 is discharged to the outside of the airbag apparatus 50, the airbag control portion 130 causes the second outside communication portion 71 to become the open state.

Figure 17:
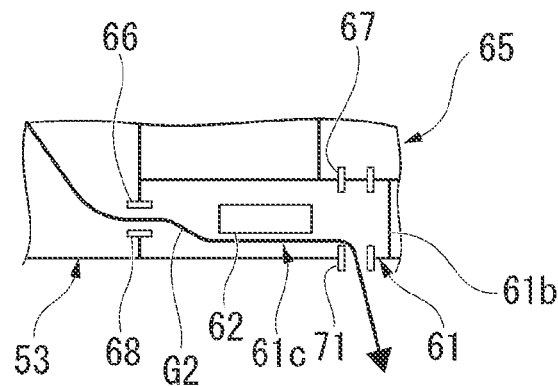
FIG. 17 is a schematic view showing a gas flow when the gas in the expanded first right chamber is discharged to the outside of the airbag apparatus.

FIG. 17 is a schematic view showing a gas flow when the gas inside the expanded first right chamber 53 is discharged to the outside of the airbag apparatus 50. As shown in FIG. 17, the gas G2 inside the expanded first right chamber 53 passes through the first right chamber expansion opening-closing valve 68, the second inflator accommodation space 61*d*, and the second outside communication portion 71 and is discharged to the outside of the airbag apparatus 50.

Figure 18:
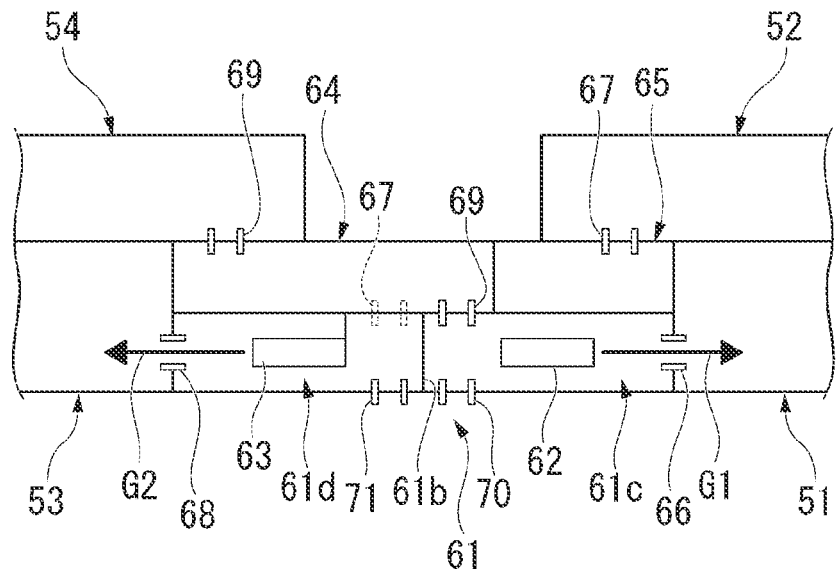
FIG. 18 is a schematic view showing a gas flow when the first left chamber and the first right chamber are expanded.

For example, when the first left chamber 51 and the first right chamber 53 are expanded, the airbag control portion 130 causes the first left chamber expansion opening-closing valve 66 and the first right chamber expansion opening-closing valve 68 to become the open state and causes the first inflator 62 and the second inflator 63 to inject a gas. FIG. 18 is a schematic view showing a gas flow when the first left chamber 51 and the first right chamber 53 are expanded. As shown in FIG. 18, a gas G1 injected from the first inflator 62 passes through the first left chamber expansion opening-closing valve 66 and flows into the first left chamber 51. Further, a gas G2 injected from the second inflator 63 passes through the first right chamber expansion opening-closing valve 68 and flows into the first right chamber 53. As a result, as shown in FIG. 6, the first left chamber 51 and the first right chamber 53 are expanded.

[Expansion Control of Airbag Apparatus]

Figure 19:
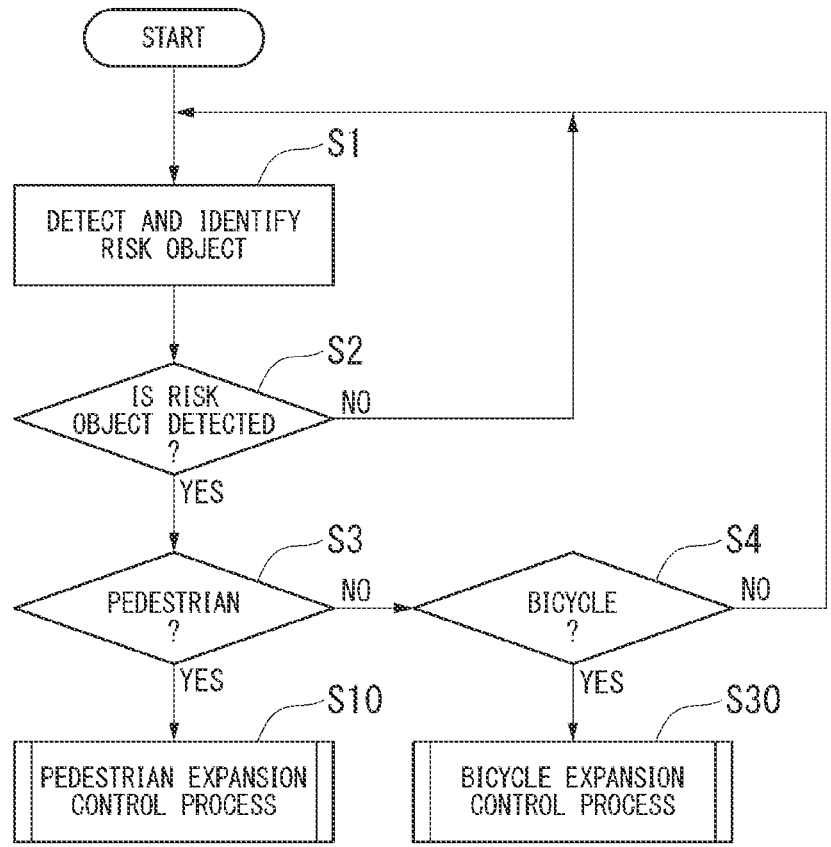
FIG. 19 is a flowchart for describing an example of a process flow for an expansion control of the airbag apparatus according to the embodiment.
Figure 20:
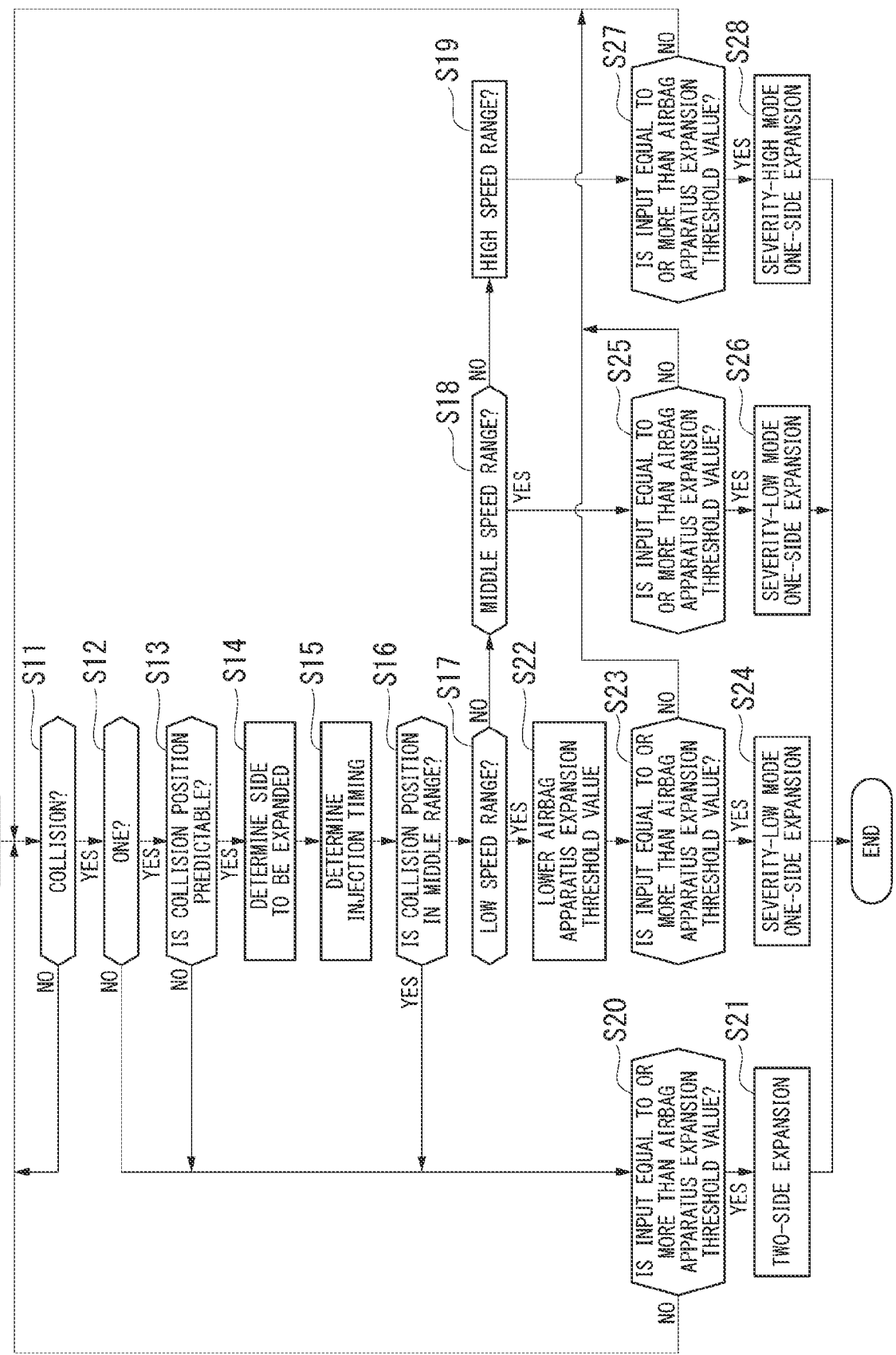
FIG. 20 is a flowchart for describing an example of a process flow for an expansion control of the airbag apparatus according to the embodiment.
Figure 21:
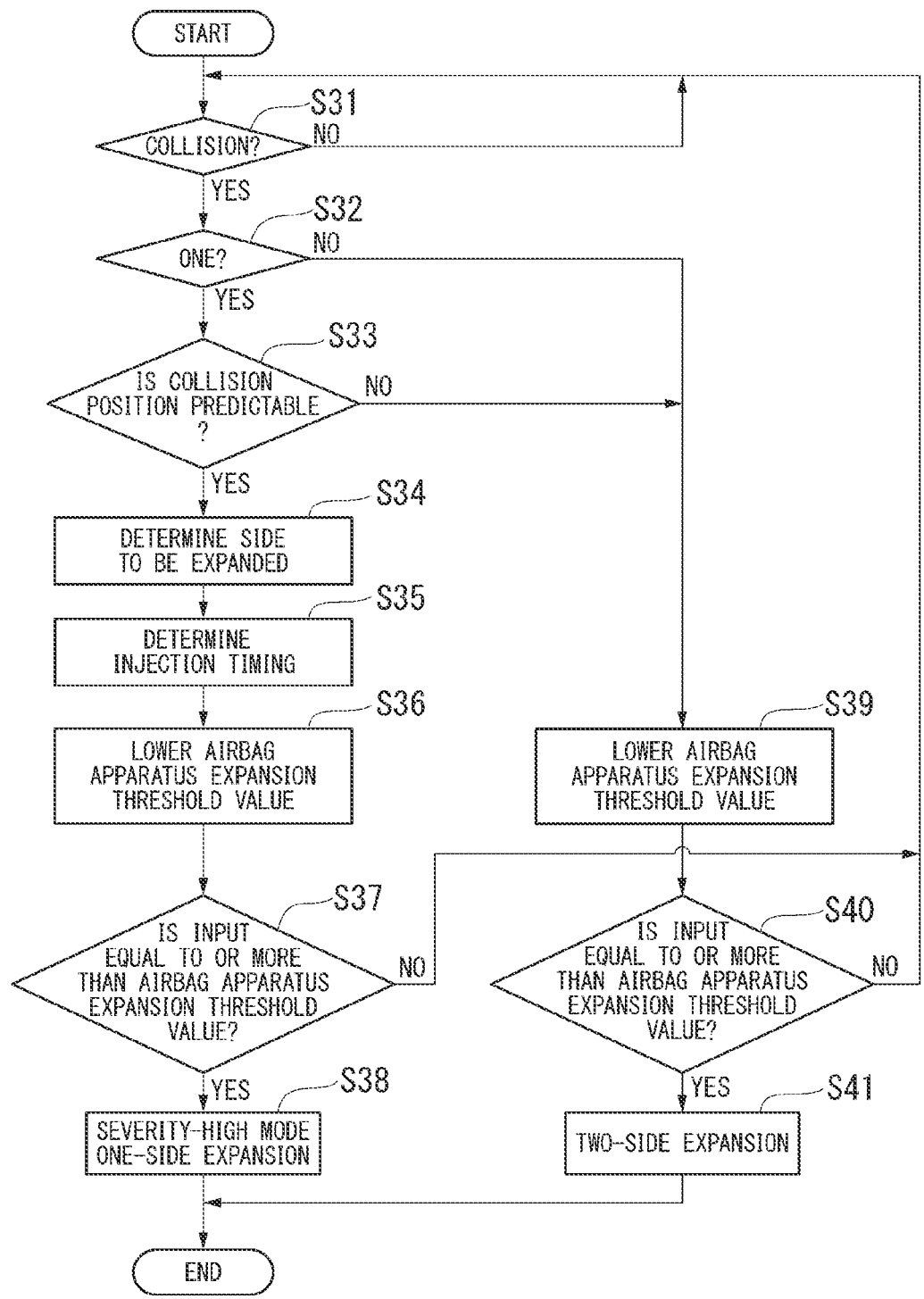
FIG. 21 is a flowchart for describing an example of a process flow for an expansion control of the airbag apparatus according to the embodiment.

FIG. 19 to FIG. 21 are a flowchart for describing an example of a process flow for an expansion control of the airbag apparatus 50.

As shown in FIG. 19, when the process flow is started, the recognition portion 110 detects and identifies a risk object (Step S1). The recognition portion 110 detects the risk object on the basis of a captured image of the camera 10, for example, as described above. Further, the recognition portion 110 acquires the position, the distance, the orientation, and the height of the risk object on the basis of the circumscribed rectangle of the outline output from the DNN, for example, as described above. Next, the recognition portion 110 determines whether or not the risk object is detected (Step S2). When the risk object is not detected, the routine returns to Step S1. When the risk object is detected, the recognition portion 110 determines whether or not the risk object is a pedestrian P1 (Step S3). When the risk object is the pedestrian P1, the control device 100 executes a pedestrian expansion control process (Step S10). When the risk object is not the pedestrian P1, the recognition portion 110 determines whether or not the risk object is a bicycle C1 (Step S4). When the risk object is the bicycle C1, the control device 100 executes a bicycle expansion control process (Step S30). When the risk object is not the bicycle C1, the routine returns to Step S1.

As described above, the embodiment is described using the case in which the risk object is the pedestrian P1 or the bicycle C1. For example, when the risk object is another vehicle (such as a motorcycle) on which a person rides in a state where the body is exposed to the outside, a process in which the bicycle C1 is replaced by another vehicle may be executed by the control device 100.

FIG. 20 is a flowchart for describing the pedestrian expansion control process (Step S10). When the pedestrian expansion control process (Step S10) is started, the contact determination portion 120 determines whether or not the pedestrian P1 collides with the vehicle M (Step S11). When the pedestrian P1 does not collide with the vehicle M, the routine returns to Step S1 again. On the other hand, when the pedestrian P1 collides with the vehicle M, next, the contact determination portion 120 determines whether or not the number of the colliding pedestrian P1 is one (Step S12). When the number of the colliding pedestrian P1 is one, the contact determination portion 120 determines whether or not the collision position of the head portion of the pedestrian P1 is predictable (Step S13). For example, when the head portion position of the pedestrian P1 in the captured image is unclear, the contact determination portion 120 determines that the collision position of the head portion of the pedestrian P1 cannot be predicted.

When the collision position of the head portion of the pedestrian P1 is predictable, the contact determination portion 120 determines whether the chamber is expanded on any of the left side and the right side of the vehicle M (Step S14). For example, the contact determination portion 120 predicts the collision time and the collision position of the head portion, for example, on the basis of the speed VM of the vehicle M and the body information of the pedestrian P1 and determines that the chamber is expanded on the left side of the vehicle M when the collision position is the left side of the vehicle M. Further, the contact determination portion 120 determines that the chamber is expanded on the right side of the vehicle M when the collision position is the right side of the vehicle M.

Next, the contact determination portion 120 determines an injection timing of the gas for expanding the chamber on the side determined in Step S14 (Step S15). The contact determination portion 120 determines the timing when the gas is injected from at least one of the first inflator 62 and the second inflator 63 such that the chamber is expanded in accordance with the predicted collision time.

Next, the contact determination portion 120 determines whether or not the collision position is in the middle range Act in the vehicle width direction (Step S16). When the collision position is not in the middle range Act in the vehicle width direction, the contact determination portion 120 determines whether or not the speed VM of the vehicle M is in a low-speed range (for example, a speed range equal to or more than 15 km/h and less than 25 km/h) (Step S17). The low-speed range is slower speed range in the speed range (first speed range) of the severity determination threshold value or less. When the speed VM of the vehicle M is in the low speed range, the contact determination portion 120 determines whether or not the speed VM of the vehicle M is in a middle speed range (for example, a speed range equal to or more than 25 km/h and less than 40 km/h) of the severity determination threshold value or less and that is faster than the low speed range (Step S18). The middle speed range is a faster speed range in the speed range (first speed range) having the severity determination threshold value or less. When the speed VM of the vehicle M is faster than the low-speed range and is not equal to or less than the severity determination threshold value, the contact determination portion 120 determines that the speed VM of the vehicle M is in a high speed range (Step S19). The high-speed range is a speed range in which the speed VM of the vehicle M is faster than the severity determination threshold value.

Further, when it is determined in Step S12 that the number of the colliding pedestrian P1 is not one, when it is determined in Step S13 that the collision position of the head portion of the pedestrian P1 cannot be predicted, or when it is determined in Step S16 that the collision position is in the middle range Act in the vehicle width direction, the control device 100 moves to Step S20.

In Step S20, the airbag control portion 130 determines whether or not the detection value that is input from the contact sensor 42 is equal to or more than the airbag apparatus expansion threshold value. When the detection value is equal to or more than the airbag apparatus expansion threshold value in Step S20, the airbag control portion 130 performs the expansion control in accordance with the two-side expansion mode (Step S21). In Step S21, the airbag control portion 130 causes the first inflator 62 and the second inflator 63 to inject the gas on the basis of the injection timing determined in Step S15 and expands the first left chamber 51 and the first right chamber 53. Then, the control device 100 completes the process flow.

When the speed VM of the vehicle M is in the low-speed range in Step S17, the airbag control portion 130 lowers the airbag apparatus expansion threshold value with respect to the expansion control of the airbag apparatus 50 (Step S22). That is, in Step S22, the sensitivity of expanding the airbag apparatus 50 is improved. Next, the airbag control portion 130 determines whether or not the detection value that is input from the contact sensor 42 is equal to or more than the airbag apparatus expansion threshold value (Step S23).

When the detection value is equal to or more than the airbag apparatus expansion threshold value in Step S23, the airbag control portion 130 performs the expansion control in accordance with the severity-low mode (Step S24). In Step S24, the airbag control portion 130 expands one of the first left chamber 51 and the first right chamber 53 which is located on the side determined in Step S14 on the basis of the injection timing determined in Step S15. Then, the control device 100 completes the process flow.

For example, when the side determined in Step S14 is the left side, in Step S24, the airbag control portion 130 injects the gas from the first inflator 62 and expands the first left chamber 51. For example, when the side determined in Step S14 is the right side, in Step S24, the airbag control portion 130 injects the gas from the second inflator 63 and expands the first right chamber 53.

When the speed VM of the vehicle M is in the middle speed range in Step S18, the airbag control portion 130 determines whether or not the detection value that is input from the contact sensor 42 is equal to or more than the airbag apparatus expansion threshold value (Step S25). When the detection value is equal to or more than the airbag apparatus expansion threshold value in Step S25, the airbag control portion 130 performs the expansion control in accordance with the severity-low mode (Step S26). In Step S26, the airbag control portion 130 expands one of the first left chamber 51 and the first right chamber 53 which is located on the side determined in Step S14 on the basis of the injection timing determined in Step S15. Then, the control device 100 completes the process flow.

For example, when the side determined in Step S14 is the left side, in Step S26, the airbag control portion 130 injects the gas from the first inflator 62 and expands the first left chamber 51. For example, when the side determined in Step S14 is the right side, in Step S26, the airbag control portion 130 injects the gas from the second inflator 63 and expands the first right chamber 53.

When the detection value input from the contact sensor 42 in Step S20 is lower than the airbag apparatus expansion threshold value, when the detection value input from the contact sensor 42 in Step S23 is lower than the airbag apparatus expansion threshold value, or when the detection value input from the contact sensor 42 in Step S25 is lower than the airbag apparatus expansion threshold value, the routine returns to Step S1. When it is determined in Step S19 that the speed VM of the vehicle M is faster than the severity determination threshold value, the airbag control portion 130 determines whether or not the detection value input from the contact sensor 42 is equal to or more than the airbag apparatus expansion threshold value (Step S27). When the detection value is equal to or more than the airbag apparatus expansion threshold value in Step S27, the airbag control portion 130 performs the expansion control in accordance with the severity-high mode (Step S28). In Step S28, the airbag control portion 130 expands one of a combination of the first left chamber 51 and the second left chamber 52 and a combination of the first right chamber 53 and the second right chamber 54 which is located on the side determined in Step S14 on the basis of the injection timing determined in Step S15. Then, the control device 100 completes the process flow.

In Step S24, Step S26, and Step S28, the airbag control portion 130 determines, as needed, the discharge timing of the gas to the outside of the airbag apparatus 50 and discharges the gas from the airbag apparatus 50 in accordance with the determined discharge timing.

Before Step S20, Step S25, and Step S27, the airbag apparatus expansion threshold value may be lowered with respect to the expansion control of the airbag apparatus 50 similarly to Step S22. Thereby, it is possible to improve the sensitivity of the airbag apparatus 50.

FIG. 21 is a flowchart for describing a bicycle expansion control process (Step S30). When the bicycle expansion control process (Step S30) is started, the contact determination portion 120 determines whether or not the bicycle C1 collides with the vehicle M (Step S31). When the bicycle C1 does not collide with the vehicle M, the routine returns to Step S1 again. On the other hand, when the bicycle C1 collides with the vehicle M, next, the contact determination portion 120 determines whether or not the number of the colliding bicycle C1 is one (Step S32). When the number of the colliding bicycle C1 is one, the contact determination portion 120 determines whether or not the collision position of the head portion of a person who rides on the bicycle C1 is predictable (Step S33). For example, when the head portion position of the person who rides on the bicycle C1 in the captured image is unclear, the contact determination portion 120 determines that the collision position of the head portion of the person who rides on the bicycle C1 cannot be predicted.

When the collision position of the head portion of the person who rides on the bicycle C1 is predictable, the contact determination portion 120 determines whether the chamber is expanded on any of the left side and the right side of the vehicle M (Step S34). For example, the contact determination portion 120 predicts the collision time and the collision position of the head portion, for example, on the basis of the relative speed between the speed VM of the vehicle M and the bicycle C1 and determines that the chamber is expanded on the left side of the vehicle M when the collision position is the left side of the vehicle M. Further, the contact determination portion 120 determines that the chamber is expanded on the right side of the vehicle M when the collision position is the right side of the vehicle M.

Next, the contact determination portion 120 determines an injection timing of the gas for expanding the chamber on the side determined in Step S34 (Step S35). The contact determination portion 120 determines the timing when the gas is injected from at least one of the first inflator 62 and the second inflator 63 such that the chamber is expanded in accordance with the predicted collision time.

When the injection timing of the gas is determined in Step S35, the airbag control portion 130 lowers the airbag apparatus expansion threshold value with respect to the expansion control of the airbag apparatus 50 (Step S36). That is, in Step S36, the sensitivity of expanding the airbag apparatus 50 is improved. Next, the airbag control portion 130 determines whether or not the detection value that is input from the contact sensor 42 is equal to or more than the airbag apparatus expansion threshold value (Step S37). When the detection value is equal to or more than the airbag apparatus expansion threshold value in Step S37, the airbag control portion 130 performs the expansion control in accordance with the severity-high mode (Step S38). In Step S38, the airbag control portion 130 expands one of the combination of the first left chamber 51 and the second left chamber 52 and the combination of the first right chamber 53 and the second right chamber 54 which is located on the side determined in Step S34 on the basis of the injection timing determined in Step S35. Then, the control device 100 completes the process flow.

Further, when it is determined in Step S32 that the number of the colliding bicycle C1 is not one, or when it is determined in Step S33 that the collision position of the head portion of the person who rides on the bicycle C1 cannot be predicted, the control device 100 moves to Step S39.

In Step S39, the airbag control portion 130 lowers the airbag apparatus expansion threshold value with respect to the expansion control of the airbag apparatus 50. That is, in Step S39, the sensitivity of expanding the airbag apparatus 50 is improved. Next, the airbag control portion 130 determines whether or not the detection value that is input from the contact sensor 42 is equal to or more than the airbag apparatus expansion threshold value (Step S40). When the detection value is equal to or more than the airbag apparatus expansion threshold value in Step S40, the airbag control portion 130 performs the expansion control in accordance with the two-side expansion mode (Step S41). In Step S41, the airbag control portion 130 injects the gas from the first inflator 62 and the second inflator 63 on the basis of a preset injection timing and expands the first left chamber 51 and the first right chamber 53. Then, the control device 100 completes the process flow.

In Step S38 and Step S41, the airbag control portion 130 determines, as needed, the discharge timing of the gas to the outside of the airbag apparatus 50 and discharges the gas from the airbag apparatus 50 in accordance with the determined discharge timing.

[Operation and Effect of Airbag Apparatus and Airbag System]

As described above, the airbag apparatus 50 of the embodiment includes the first left chamber 51, the second left chamber 52, the first right chamber 53, the second right chamber 54, and the gas supply unit 60. The first left chamber 51 is expandable so as to cover the outer surface of the front left pillar PL which is located on the left side with respect to the vehicle width direction of the vehicle M. The second left chamber 52 is expandable on the first left chamber 51. The first right chamber 53 is expandable so as to cover the outer surface of the front right pillar PR which is located on the right side with respect to the vehicle width direction of the vehicle M. The second right chamber 54 is expandable on the first right chamber 53. The gas supply unit 60 supplies the gas for expansion selectively to the first left chamber 51, the second left chamber 52, the first right chamber 53, and the second right chamber 54.

According to such an airbag apparatus 50 of the embodiment, by selectively expanding the first left chamber 51, the second left chamber 52, the first right chamber 53, and the second right chamber 54, it is possible to change a potential energy. For example, the potential energy of the airbag apparatus 50 is further increased in the case where the first left chamber 51 and the second left chamber 52 are expanded than the case where only the first left chamber 51 is expanded. Therefore, the airbag apparatus 50 of the embodiment can appropriately protect even a risk object having a fast speed such as the bicycle C1. Accordingly, the airbag apparatus 50 of the embodiment can appropriately protect even a person who rides on another vehicle such as the bicycle C1 in the state where the body is exposed to the outside.

Further, in the airbag apparatus 50 of the embodiment, the length L2 of the second left chamber 52 in the direction along the extension direction of the front left pillar PL at the time of expansion is smaller than the length L1 of the first left chamber 51 at the time of expansion. Therefore, the volume of the second left chamber 52 can be smaller than the volume of the first left chamber 51. Accordingly, when the same amount of gas is supplied to the first left chamber 51 and the second left chamber 52, the internal pressure of the second left chamber 52 is higher than the internal pressure of the first left chamber 51. Therefore, the potential energy in the case where the second left chamber 52 is expanded in addition to the first left chamber 51 can be further enhanced than a case where a first left chamber 51 and a second left chamber 52 that have the same length are expanded. Accordingly, the airbag apparatus 50 of the embodiment can deal with a higher class of severity.

Further, in the airbag apparatus 50 of the embodiment, the length L4 of the second right chamber 54 in the direction along the extension direction of the front right pillar PR at the time of expansion is smaller than the length L3 of the first right chamber 53 at the time of expansion. Therefore, the volume of the second right chamber 54 can be smaller than the volume of the first right chamber 53. Accordingly, when the same amount of gas is supplied to the first right chamber 53 and the second right chamber 54, the internal pressure of the second right chamber 54 is higher than the internal pressure of the first right chamber 53. Therefore, the potential energy in the case where the second right chamber 54 is expanded in addition to the first right chamber 53 can be further enhanced than a case where a first right chamber 53 and a second right chamber 54 that have the same length are expanded. Accordingly, the airbag apparatus 50 of the embodiment can deal with a higher class of severity.

Further, in the airbag apparatus 50 of the embodiment, the first left chamber 51 includes the left pillar coverage portion 51a that extends along the extension direction of the front left pillar PL. Further, the second left chamber 52 includes the left pillar coverage portion 52a that extends along the extension direction of the front left pillar PL. Further, at least part of the left pillar coverage portion 52a of the second left chamber 52 at the time of expansion is located on the right side with respect to the vehicle width direction relative to the left pillar coverage portion 51a of the first left chamber 51 at the time of expansion. Therefore, in the case where the second left chamber 52 is expanded in addition to the first left chamber 51, a wider area of the vehicle M can be covered by the airbag apparatus 50 than the case where only the first left chamber 51 is expanded. Therefore, even when the other vehicle such as the bicycle C1 of which the proceeding speed is fast collides with the vehicle M, the airbag apparatus 50 of the embodiment can appropriately protect an occupant of the other vehicle.

Further, in the airbag apparatus 50 of the embodiment, the first right chamber 53 includes the right pillar coverage portion 53a that extends along the extension direction of the front right pillar PR. Further, the second right chamber 54 includes the right pillar coverage portion 54a that extends along the extension direction of the front right pillar PR. At least part of the right pillar coverage portion 54a of the second right chamber 54 at the time of expansion is located on the left side with respect to the vehicle width direction relative to the right pillar coverage portion 53a of the first right chamber 53 at the time of expansion. Therefore, in the case where the second right chamber 54 is expanded in addition to the first right chamber 53, a wider area of the vehicle M can be covered by the airbag apparatus 50 than the case where only the first right chamber 53 is expanded. Therefore, even when the other vehicle such as the bicycle C1 of which the proceeding speed is fast collides with the vehicle M, the airbag apparatus 50 of the embodiment can appropriately protect an occupant of the other vehicle.

Further, in the airbag apparatus 50 of the embodiment, the first left chamber 51 has the hood coverage portion 51b that covers the outer surface of the rear end portion H1 of the hood HD included in the vehicle M at the time of expansion. Further, the second left chamber 52 has the hood coverage portion 52b that covers the outer surface of the rear end portion H1 of the hood HD included in the vehicle M at the time of expansion. The first right chamber 53 has the hood coverage portion 53b that covers the outer surface of the rear end portion H1 of the hood HD included in the vehicle M at the time of expansion. The second right chamber 54 has the hood coverage portion 54b that covers the outer surface of the rear end portion H1 of the hood HD included in the vehicle M at the time of expansion. The airbag apparatus 50 of the embodiment can prevent a person from colliding with the rear end portion H1 of the hood HD by the hood coverage portion 51b, the hood coverage portion 52b, the hood coverage portion 53b, and the hood coverage portion 54b.

Further, in the airbag apparatus 50 of the embodiment, the connection portion 51c connected to the gas supply unit 60 is provided on the hood coverage portion 51b of the first left chamber 51. Therefore, the first left chamber 51 is connected to the gas supply unit 60 via the hood coverage portion 51b, and it is not necessary to provide a connection portion as a separate body that connects the first left chamber 51 to the gas supply unit 60. Accordingly, such an airbag apparatus 50 of the embodiment has a simple configuration. Further, in the airbag apparatus 50 of the embodiment, the connection portion 52c connected to the gas supply unit 60 is provided on the hood coverage portion 52b of the second left chamber 52. Further, the connection portion 53c connected to the gas supply unit 60 is provided on the hood coverage portion 53b of the first right chamber 53. Further, the connection portion 54c connected to the gas supply unit 60 is provided on the hood coverage portion 54b of the second right chamber 54. Accordingly, the airbag apparatus 50 of the embodiment has a simple configuration.

Further, in the airbag apparatus 50 of the embodiment, the gas supply unit 60 includes the first inflator 62, the first left chamber expansion opening-closing valve 66, the second right chamber expansion opening-closing valve 69, the second inflator 63, the first right chamber expansion opening-closing valve 68, and the second left chamber expansion opening-closing valve 67. The first inflator 62 injects the gas G1 supplied to any of the first left chamber 51 and the second right chamber 54. The first left chamber expansion opening-closing valve 66 is located between the first inflator 62 and the first left chamber 51. The second right chamber expansion opening-closing valve 69 is located between the first inflator 62 and the second right chamber 54. The second inflator 63 injects the gas G2 supplied to any of the first right chamber 53 and the second left chamber 52. The first right chamber expansion opening-closing valve 68 is located between the second inflator 63 and the first right chamber 53. The second left chamber expansion opening-closing valve 67 is located between the second inflator 63 and the second left chamber 52.

According to such an airbag apparatus 50 of the embodiment, it is possible to selectively expand any of the first left chamber 51 and the second right chamber 54 by the gas G1 injected from the first inflator 62. Further, it is possible to selectively expand any of the first right chamber 53 and the second left chamber 52 by the gas G2 injected from the second inflator 63. That is, according to the airbag apparatus 50 of the embodiment, two inflators are provided for the four chambers, and it is not necessary to provide the inflator for each of the four chambers. Accordingly, the airbag apparatus 50 of the embodiment can reduce the number of installed inflators and provide a simple apparatus configuration.

Further, in the airbag apparatus 50 of the embodiment, the gas supply unit 60 further includes the first connection chamber 64 and the second connection chamber 65. The first connection chamber 64 connects the first inflator 62 to the second right chamber 54, and the second right chamber expansion opening-closing valve 69 is provided on the first connection chamber 64. The second connection chamber 65 connects the second inflator 63 to the second left chamber 52, and the second left chamber expansion opening-closing valve 67 is provided on the second connection chamber 65.

According to such an airbag apparatus 50 of the embodiment, there is not a portion at which the flow path of the gas G1 injected from the first inflator 62 and the flow path of the gas G2 injected from the second inflator 63 are connected to each other via an opening-closing valve. Therefore, the airbag apparatus 50 of the embodiment can appropriately guide the gas G1 injected from the first inflator 62 and the gas G2 injected from the second inflator 63.

Figure 22:
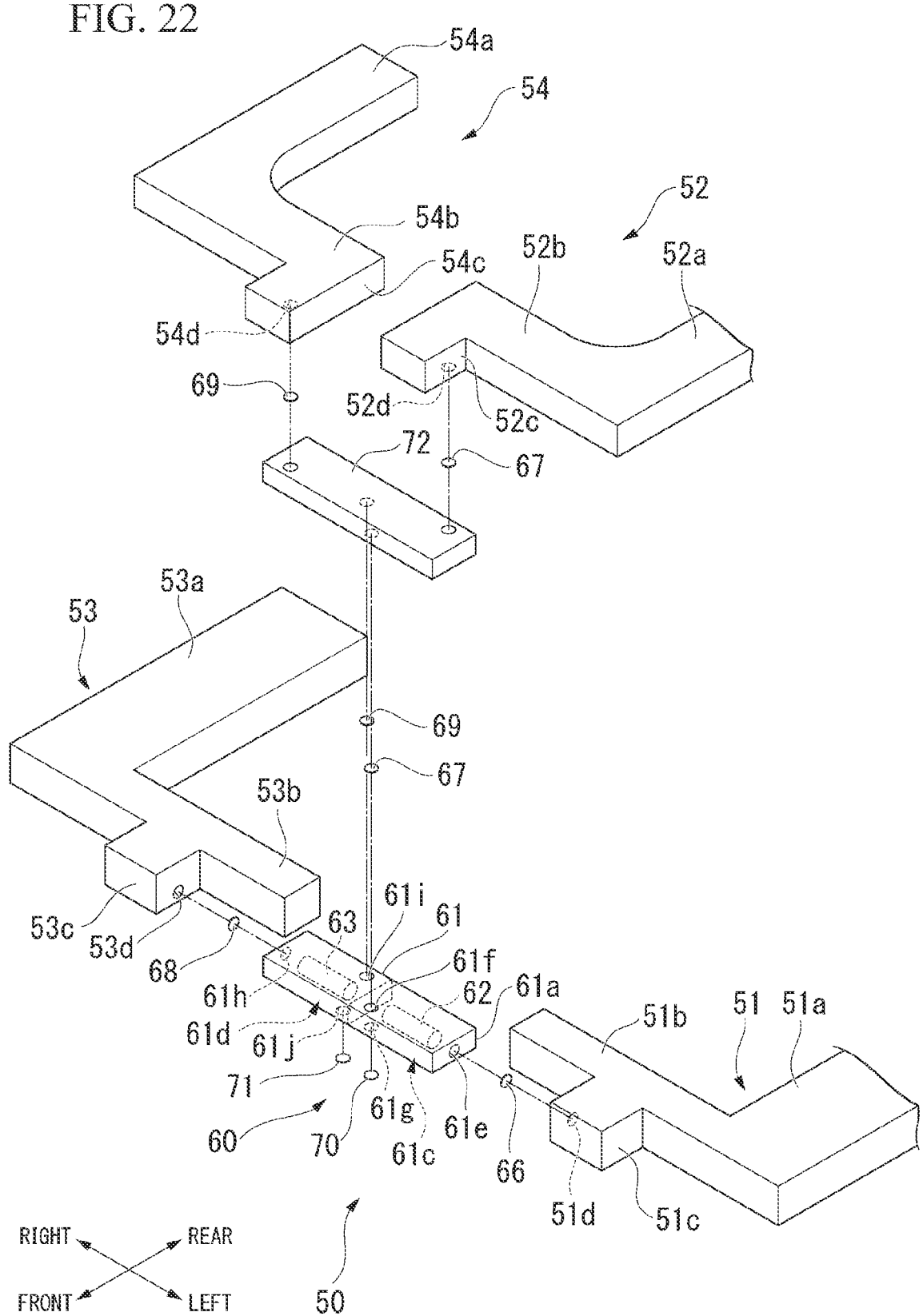
FIG. 22 is a schematic exploded perspective view of a modification example of the airbag apparatus according to the embodiment.

FIG. 22 is an exploded perspective view showing a modification example of the airbag apparatus 50. As shown in FIG. 22, a common connection chamber 72 (common connection portion) may be provided in place of the first connection chamber 64 and the second connection chamber 65. The common connection chamber 72 connects the first inflator 62 and the second inflator 63 to the second left chamber 52 and the second right chamber 54.

Further, two second right chamber expansion opening-closing valve 69 and two second left chamber expansion opening-closing valve 67 are provided on the common connection chamber 72. For example, by causing the two second right chamber expansion opening-closing valves 69 to be in an open state, the gas G1 of the first inflator 62 can flow into the second right chamber 54. Further, for example, by causing the two second left chamber expansion opening-closing valve 67 to be in an open state, the gas G2 of the second inflator 63 can flow into the second left chamber 52. In such a modification example of the airbag apparatus 50 of the embodiment, the number of components is reduced, and a simple apparatus configuration is provided.

Further, in the airbag apparatus 50 of the embodiment, the gas supply unit 60 further includes the first outside communication portion 70 and the second outside communication portion 71. The first outside communication portion 70 is capable of externally discharging the gas G1 in the expanded first left chamber 51. The second outside communication portion 71 is capable of externally discharging the gas in the expanded second right chamber 54. Therefore, the airbag apparatus 50 of the embodiment can prevent the risk object from rebounding by the first left chamber 51 and the first right chamber 53.

Further, the airbag system 200 of the embodiment includes the airbag apparatus 50 and the control device 100 that controls the gas supply unit 60. According to such an airbag system 200, since the system includes the airbag apparatus 50, by selectively expanding the first left chamber 51, the second left chamber 52, the first right chamber 53, and the second right chamber 54, it is possible to change a potential energy.

Further, the airbag system 200 of the embodiment includes the first left chamber 51, the second left chamber 52, the first right chamber 53, the second right chamber 54, the recognition portion 110, the contact determination portion 120, and the airbag control portion 130. The first left chamber 51 is expandable so as to cover the outer surface of the front left pillar PL which is located on the left side with respect to the vehicle width direction of the vehicle M. The second left chamber 52 is expandable on the first left chamber 51. The first right chamber 53 is expandable so as to cover the outer surface of the front right pillar PR which is located on the right side with respect to the vehicle width direction of the vehicle M. The second right chamber 54 is expandable on the first right chamber 53. The recognition portion 110 recognizes a risk object which is present in the vicinity of the vehicle M. The contact determination portion 120 predicts a collision between the risk object and the vehicle M. The airbag control portion 130 performs the expansion control of the first left chamber 51, the second left chamber 52, the first right chamber 53, and the second right chamber 54 on the basis of the prediction of the contact determination portion 120.

In such an airbag system 200 of the embodiment, by selectively expanding the first left chamber 51, the second left chamber 52, the first right chamber 53, and the second right chamber 54, it is possible to change a potential energy. For example, the potential energy of the airbag apparatus 50 is further increased in the case where the first left chamber 51 and the second left chamber 52 are expanded than the case where only the first left chamber 51 is expanded. Therefore, the airbag system 200 of the embodiment can appropriately protect even a risk object having a fast speed such as the bicycle C1. Accordingly, the airbag system 200 of the embodiment can appropriately protect even a person who rides on another vehicle such as the bicycle C1 in the state where the body is exposed to the outside.

Further, in the airbag system 200 of the embodiment, the contact determination portion 120 predicts the collision position of the risk object in the vehicle M, and when the collision position is the left side with respect to the vehicle width direction of the vehicle M, the airbag control portion 130 expands only the first left chamber 51, or the first left chamber 51 and the second left chamber 52. Further, the contact determination portion 120 predicts the collision position of the risk object in the vehicle M, and when the collision position is the right side with respect to the width direction of the vehicle M, the airbag control portion 130 expands only the first right chamber 53, or the first right chamber 53 and the second right chamber 54.

According to the airbag system 200 of the embodiment, the chamber is expanded at a position where the risk object collides, and the chamber is not expanded at a position where the risk object does not collide. Therefore, it is possible to prevent the chamber from being expanded at an unnecessary position.

Further, in the airbag system 200 of the embodiment, when the recognition portion 110 recognizes the pedestrian as the risk object, the contact determination portion 120 predicts the collision between the pedestrian and the vehicle M, and the speed of the vehicle M is in a speed range (first speed range) which is lower than the severity determination threshold value, the airbag control portion 130 expands the first left chamber 51 or the first right chamber 53 in accordance with the collision position. On the other hand, when the recognition portion 110 recognizes the pedestrian as the risk object, the contact determination portion 120 predicts the collision between the pedestrian and the vehicle M, and the speed of the vehicle M is in a speed range (second speed range) which is higher than the severity determination threshold value, the airbag control portion 130 expands both the first left chamber 51 and the second left chamber 52, or both the first right chamber 53 and the second right chamber 54 in accordance with the collision position.

According to such an airbag system 200 of the embodiment, when the speed of the vehicle M is higher than the severity determination threshold value, the two chambers are expanded so as to overlap with each other. Therefore, even when the speed of the vehicle M is higher than the severity determination threshold value, it is possible to relieve the impact on the risk object.

Further, in the airbag system 200 of the embodiment, when the recognition portion 110 recognizes a pedestrian P1 as a risk object and it is predicted that the pedestrian P1 will collide with the vehicle M, the contact determination portion 120 predicts the time at which the head portion of the pedestrian P1 collides with the vehicle M on the basis of the body information of the pedestrian P1 and the speed VM of the vehicle M. Further, the airbag control portion 130 performs the expansion control in accordance with the time predicted by the contact determination portion 120. Therefore, the airbag system 200 of the embodiment can expand the chamber at the instant of the head portion of the pedestrian P1 colliding with the vehicle M, and it is possible to further relieve the impact which the head portion of the pedestrian P1 receives.

Further, in the airbag system 200 of the embodiment, the contact determination portion 120 predicts that the time at which the head portion collides with the vehicle M is later as the head portion position of the pedestrian P1 is higher and predicts that the time at which the head portion collides with the vehicle M is earlier as the speed of the vehicle M is faster. The time at which the head portion collides with the vehicle M tends to be later as the head portion position of the pedestrian P1 is higher. Therefore, according to the airbag system 200 of the embodiment, it is possible to further reliably expand the chamber at the instant of the pedestrian P1 colliding with the vehicle M, and it is possible to further relieve the impact which the head portion of the pedestrian P1 receives.

Further, in the airbag system 200 of the embodiment, when the recognition portion 110 recognizes the pedestrian P1 as the risk object and the collision position of the risk object in the vehicle M predicted by the contact determination portion 120 is in the preset middle range in the vehicle width direction, the airbag control portion 130 expands the first left chamber 51 and the first right chamber 53. According to the airbag system 200 of the embodiment, when it is impossible to determine whether the collision position is any of the right and left sides of the vehicle M, the chamber is expanded on both sides in the vehicle width direction of the vehicle M. Therefore, even when it is impossible to determine whether the collision position is any of the right and left sides of the vehicle M, it is possible to protect the risk object.

Further, in the airbag system 200 of the embodiment, when the recognition portion 110 recognizes a bicycle C1 (another vehicle on which a person rides in a state where the body is exposed to the outside) as a risk object and the contact determination portion 120 predicts the collision between another vehicle and the vehicle M, the airbag control portion 130 expands, in accordance with the collision position, the first left chamber 51 and the second left chamber 52, or the first right chamber 53 and the second right chamber 54. According to the airbag system 200 of the embodiment, when the bicycle C1 or the like of which the speed is likely to be faster than that of the pedestrian P1 collides with the vehicle M, the two chambers are expanded so as to overlap with each other. Therefore, even when the speed of the risk object is fast, it is possible to relieve the impact on the risk object.

Further, in the airbag system 200 of the embodiment, when the recognition portion 110 recognizes a bicycle C1 (another vehicle on which a person rides in a state where the body is exposed to the outside) as a risk object and it is predicted that the bicycle P1 will collide with the vehicle M, the contact determination portion 120 predicts the time at which the head portion of a person who rides on the bicycle C1 collides with the vehicle M on the basis of the head portion position of the person who rides on another vehicle and the relative speed of another vehicle relative to the vehicle M. Further, the airbag control portion 130 performs the expansion control in accordance with the time predicted by the contact determination portion 120. Therefore, the airbag system 200 of the embodiment can expand the chamber at the instant of the head portion of the occupant of the bicycle C1 colliding with the vehicle M, and it is possible to further relieve the impact which the head portion of the occupant of the bicycle C1 receives.

Further, in the airbag system 200 of the embodiment, the contact determination portion 120 predicts that the time at which the head portion collides with the vehicle M is later as the head portion position of the person who rides on the bicycle C1 is higher and predicts that the time at which the head portion collides with the vehicle M is earlier as the relative speed between the vehicle M and the bicycle C1 is faster. The time at which the head portion collides with the vehicle M tends to be later as the head portion position is higher, and the time at which the head portion collides with the vehicle M tends to be earlier as the relative speed is faster. Therefore, according to the airbag system 200 of the embodiment, it is possible to expand the chamber at the instant of the head portion of the person who rides on the bicycle C1 colliding with the vehicle M, and it is possible to further relieve the impact which the head portion of the person who rides on the bicycle C1 receives.

Further, in the airbag system 200 of the embodiment, when the first left chamber 51 is expanded, the airbag control portion 130 reduces the internal pressure of the first left chamber 51 in accordance with a timing when the risk object comes into contact with the first left chamber 51. Therefore, it is possible to prevent the risk object from rebounding by the first left chamber 51. Further, when the first right chamber 53 is expanded, the airbag control portion 130 reduces the internal pressure of the first right chamber 53 in accordance with a timing when the risk object comes into contact with the first right chamber 53. Therefore, it is possible to prevent the risk object from rebounding by the first right chamber 53.

Further, in the airbag system 200 of the embodiment, when the contact determination portion 120 predicts that there are a plurality of risk objects that will collide with the vehicle M, or when the contact determination portion 120 cannot predict the collision position of the risk object in the vehicle M, the airbag control portion 130 expands the first left chamber 51 and the first right chamber 53. According to the airbag system 200 of the embodiment, when there are a plurality of colliding risk objects, or when it is impossible to determine which side of the right and left sides of the vehicle M is the collision position, the chamber is expanded on both sides in the vehicle width direction of the vehicle M.

Therefore, even when there are a plurality of colliding risk objects, or even when it is impossible to determine which side of the right and left sides of the vehicle M is the collision position, it is possible to protect the risk object.

The embodiment described above can be represented as an object protection apparatus including a storage device that stores a program and a hardware processor and configured to: by the hardware processor executing the program stored in the storage device, recognize a periphery situation of a vehicle; predict a collision between the recognized risk object and the vehicle; and based on the prediction, perform an expansion control of a first left chamber that is expandable so as to cover an outer surface of a front left pillar which is located on a left side with respect to a vehicle width direction of the vehicle, a second left chamber that is expandable on the first left chamber, a first right chamber that is expandable so as to cover an outer surface of a front right pillar which is located on a right side with respect to the vehicle width direction of the vehicle, and a second right chamber that is expandable on the first right chamber.

Although a mode for implementing the present invention has been described using the embodiments, the present invention is not limited to such embodiments, and various modifications and substitutions can be made without departing from the scope of the present invention.

What is claimed is:

1. An airbag system comprising:
   a first left chamber that is expandable so as to cover an outer surface of a front left pillar which is located on a left side with respect to a vehicle width direction of a vehicle;
   a second left chamber that is expandable on the first left chamber;
   a first right chamber that is expandable so as to cover an outer surface of a front right pillar which is located on a right side with respect to the vehicle width direction of the vehicle;
   a second right chamber that is expandable on the first right chamber;
   a recognition portion that recognizes a risk object which is present in a vicinity of the vehicle;
   a prediction portion that predicts a collision between the risk object and the vehicle; and
   an expansion control portion that performs an expansion control of the first left chamber, the second left chamber, the first right chamber, and the second right chamber based on a prediction of the prediction portion.

2. The airbag system according to claim 1,
   wherein in a case where the prediction portion predicts a collision position of the risk object in the vehicle,
   the expansion control portion
      expands only the first left chamber, or the first left chamber and the second left chamber when the collision position is a left side with respect to the vehicle width direction of the vehicle, and
      expands only the first right chamber, or the first right chamber and the second right chamber when the collision position is a right side with respect to the vehicle width direction of the vehicle.

3. The airbag system according to claim 2,
   wherein in a case where the recognition portion recognizes a pedestrian as the risk object and the prediction portion predicts a collision between the pedestrian and the vehicle,
   the expansion control portion
      expands the first left chamber or the first right chamber in accordance with the collision position when a speed of the vehicle is in a first speed range, and
      expands both the first left chamber and the second left chamber, or both the first right chamber and the second right chamber in accordance with the collision position when the speed of the vehicle is in a second speed range on a higher speed side than the first speed range.

4. The airbag system according to claim 2,
wherein in a case where the recognition portion recognizes a pedestrian as the risk object,
when it is predicted that the pedestrian will collide with the vehicle, the prediction portion predicts a time at which a head portion of the pedestrian collides with the vehicle based on body information of the pedestrian and a speed of the vehicle, and
the expansion control portion performs the expansion control in accordance with the time.

5. The airbag system according to claim 4,
wherein the prediction portion
predicts that a time at which the head portion collides with the vehicle is later as a head portion position of the pedestrian is higher; and
predicts that the time at which the head portion collides with the vehicle is earlier as a speed of the vehicle is faster.

6. The airbag system according to claim 2,
wherein in a case where the recognition portion recognizes a pedestrian as the risk object and the collision position of the risk object in the vehicle that is predicted by the prediction portion is in a preset middle range in the vehicle width direction, the expansion control portion expands at least the first left chamber and the first right chamber.

7. The airbag system according to claim 2,
wherein in a case where the recognition portion recognizes another vehicle on which a person rides in a state where a body is exposed to an outside as the risk object and the prediction portion predicts a collision between the other vehicle and the vehicle, the expansion control portion expands the first left chamber and the second left chamber, or the first right chamber and the second right chamber in accordance with the collision position.

8. The airbag system according to claim 2,
wherein in a case where the recognition portion recognizes another vehicle on which a person rides in a state where a body is exposed to an outside as the risk object,
when it is predicted that the other vehicle will collide with the vehicle, the prediction portion predicts a time at which a head portion of a person who rides on the other vehicle collides with the vehicle based on a head portion position of the person who rides on the other vehicle and a relative speed of the other vehicle relative to the vehicle, and
the expansion control portion performs the expansion control in accordance with the time.

9. The airbag system according to claim 8,
wherein the prediction portion
predicts that a time at which the head portion collides with the vehicle is later as the head portion position is higher and
predicts that the time at which the head portion collides with the vehicle is earlier as the relative speed is faster.

10. The airbag system according to claim 1,
wherein when the first left chamber is expanded, the expansion control portion reduces an internal pressure of the first left chamber in accordance with a timing when the risk object comes into contact with the first left chamber, and
when the first right chamber is expanded, the expansion control portion reduces an internal pressure of the first right chamber in accordance with a timing when the risk object comes into contact with the first right chamber.

11. The airbag system according to claim 1,
wherein when the prediction portion predicts that there are a plurality of risk objects that will collide with the vehicle, or when the prediction portion is not able to predict a collision position of the risk object in the vehicle, the expansion control portion expands at least the first left chamber and the first right chamber.

12. An object protection method comprising:
recognizing a periphery situation of a vehicle;
predicting a collision between a recognized risk object and the vehicle; and
based on a prediction, performing an expansion control of
a first left chamber that is expandable so as to cover an outer surface of a front left pillar which is located on a left side with respect to a vehicle width direction of the vehicle,
a second left chamber that is expandable on the first left chamber,
a first right chamber that is expandable so as to cover an outer surface of a front right pillar which is located on a right side with respect to the vehicle width direction of the vehicle, and
a second right chamber that is expandable on the first right chamber.

13. A computer-readable non-transitory recording medium which includes a program causing a computer to:
recognize a risk object which is present in a vicinity of a vehicle;
predict a collision between the risk object and the vehicle; and
based on a prediction, perform an expansion control of
a first left chamber that is expandable so as to cover an outer surface of a front left pillar which is located on a left side with respect to a vehicle width direction of the vehicle,
a second left chamber that is expandable on the first left chamber,
a first right chamber that is expandable so as to cover an outer surface of a front right pillar which is located on a right side with respect to the vehicle width direction of the vehicle, and
a second right chamber that is expandable on the first right chamber.

* * * * *